(12) United States Patent
Zheng et al.

(10) Patent No.: US 11,343,560 B2
(45) Date of Patent: May 24, 2022

(54) SYSTEMS AND METHODS FOR SYNCHRONIZING AUDIO AND VIDEO

(71) Applicant: ZHEJIANG XINSHENG ELECTRONIC TECHNOLOGY CO., LTD., Zhejiang (CN)

(72) Inventors: Guojian Zheng, Hangzhou (CN); Huimin Zheng, Hangzhou (CN); Genqiang Cui, Hangzhou (CN); Bingyun Lyu, Hangzhou (CN); Wei Fang, Hangzhou (CN)

(73) Assignee: ZHEJIANG XINSHENG ELECTRONIC TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/990,022

(22) Filed: Aug. 11, 2020

(65) Prior Publication Data
US 2020/0374582 A1 Nov. 26, 2020

Related U.S. Application Data

(63) Continuation of application No. PCT/CN2018/125216, filed on Dec. 29, 2018.

(30) Foreign Application Priority Data

Feb. 11, 2018 (CN) .................... 201810141325.X

(51) Int. Cl.
*H04N 21/43* (2011.01)
*H04N 5/06* (2006.01)
*H04N 21/485* (2011.01)

(52) U.S. Cl.
CPC ......... *H04N 21/43072* (2020.08); *H04N 5/06* (2013.01); *H04N 21/4305* (2013.01); *H04N 21/4852* (2013.01)

(58) Field of Classification Search
CPC ......... H04N 21/4392; H04N 21/44004; H04N 21/442; H04N 19/146; H04N 21/23406;
(Continued)

(56) References Cited

U.S. PATENT DOCUMENTS 5,583,652 A * 12/1996 Ware .................... G10H 1/0033
386/206
6,122,668 A 9/2000 Teng et al.
(Continued)

FOREIGN PATENT DOCUMENTS

| CN | 101674486 A | 3/2010 |
|---|---|---|
| CN | 103546662 A | 1/2014 |

(Continued)

OTHER PUBLICATIONS

International Search Report in PCT/CN2018/125216 dated Mar. 18, 2019, 4 pages.
(Continued)

*Primary Examiner* — John W Miller
*Assistant Examiner* — Humam M Satti
(74) *Attorney, Agent, or Firm* — Metis IP LLC

(57) ABSTRACT

The present disclosure relates to systems and methods for synchronizing audio and video. The systems and methods may perform operations including: obtaining a data stream including a sequence of video frames and a sequence of audio samples; inputting the sequence of video frames into a video channel, the sequence of video frames being processed and outputted from the video channel; inputting, for processing, the sequence of audio samples into an audio channel, the audio channel including a data buffer configured to buffer processed audio samples, a volume threshold of the data buffer being determined according to a time for processing one or more successive video frames; determining that a data volume of audio samples buffered in the data
(Continued)

buffer exceeds the volume threshold; and in response to a determination that the data volume of buffered audio samples exceeds the volume threshold, outputting the buffered audio samples from the audio channel.

18 Claims, 9 Drawing Sheets

(58) Field of Classification Search
CPC ............ H04N 21/4307; H04N 5/9267; H04N 21/43072; H04N 5/06; H04N 21/4305; H04N 21/4852; H04N 21/8106; H04N 21/816; H04N 21/4382; G10H 1/0033; H04L 47/12
See application file for complete search history.

(56) References Cited

U.S. PATENT DOCUMENTS

| | | | |
|---|---|---|---|
| 6,546,426 B1 | 4/2003 | Post | |
| 6,549,722 B2* | 4/2003 | Okada | H04N 5/9267 386/245 |
| 6,665,751 B1* | 12/2003 | Chen | H04N 21/23406 365/191 |
| 6,816,909 B1 | 11/2004 | Chang et al. | |
| 2005/0185718 A1* | 8/2005 | Nelson | H04N 21/442 375/240.27 |
| 2008/0028276 A1 | 1/2008 | Li et al. | |
| 2008/0267590 A1* | 10/2008 | Otsuka | H04N 21/4343 386/354 |
| 2008/0304571 A1* | 12/2008 | Tsukagoshi | H04N 21/4307 375/240.25 |
| 2013/0242186 A1* | 9/2013 | Zhu | H04N 19/146 348/441 |
| 2015/0170670 A1 | 6/2015 | Luyten et al. | |
| 2016/0134931 A1 | 5/2016 | Song et al. | |
| 2017/0063692 A1* | 3/2017 | Roncero Izquierdo | H04L 47/12 |

FOREIGN PATENT DOCUMENTS

| | | |
|---|---|---|
| CN | 104902317 A | 9/2015 |
| CN | 101710958 B | 11/2015 |
| CN | 103338386 B | 1/2016 |
| CN | 105744334 A | 7/2016 |
| CN | 106657090 A | 5/2017 |
| CN | 106658133 A | 5/2017 |
| CN | 107517400 A | 12/2017 |
| EP | 0577216 A1 | 1/1994 |
| TW | 201029468 A | 8/2010 |
| WO | 2019153960 A1 | 8/2019 |

OTHER PUBLICATIONS

Written Opinion in PCT/CN2018/125216 dated Mar. 18, 2019, 5 pages.
First Office Action in Chinese Application No. 201810141325.X dated Jul. 1, 2019, 13 pages.
The Extended European Search Report in European Application No. 18905608.8 dated Dec. 18, 2020, 8 pages.

* cited by examiner

SYSTEMS AND METHODS FOR SYNCHRONIZING AUDIO AND VIDEO

CROSS-REFERENCE TO RELATED APPLICATIONS

This application is a Continuation of International Application No. PCT/CN2018/125216 filed on Dec. 29, 2018, which claims priority to Chinese Application No. 201810141325.X, filed on Feb. 11, 2018, the entire contents of each of which are hereby incorporated by reference.

TECHNICAL FIELD

The present disclosure generally relates to multimedia techniques, and in particular, to systems and methods for synchronizing audio and video.

BACKGROUND

Multimedia contents (e.g., television broadcasts, movie playbacks, etc.) generally contain rich audio and video information. When audio and video data is delivered to a terminal (e.g., a smartphone, a television, etc.), the audio data may be inputted into an audio channel for processing and then be outputted to an audio player (e.g., a loudspeaker of the terminal) for play, and the video data may be inputted into a video channel for processing and then be outputted to a video display (e.g., a display screen of the terminal) for display. In general, video data processing may cost much more time than audio data processing. Thus, the audio data and the video data may sometimes become out of synchronization, which may affect user experience.

At present, in order to solve the desynchronization problem of audio and video, one approach is to use a synchronization identifier. Specifically, the audio data may be inputted into an audio buffer, and the video data may be inputted into a video buffer. Whether the audio data and the video data are synchronous or not may be determined according to the synchronization identifier. If it is determined that the audio data and the video data are out of synchronization, the audio buffer and the video buffer may be reinitialized. However, the reinitialization of the audio buffer and the video buffer may cause the discontinuity in playing the audio data and the video data, further resulting in poor user experience. Besides, if the video data in the video channel loses one or more video frames, the outputted audio data cannot match the outputted video data, resulting in the failure of playing the audio data and the video data. Therefore, it is desirable to provide systems and methods for implementing the synchronization of audio and video.

SUMMARY

In one aspect of the present disclosure, a system for synchronizing audio and video is provided. The system may include at least one storage device and at least one processor in communication with the at least one storage device. The at least one storage device may include a set of instructions. When executing the set of instructions, the at least one processor may be configured to cause the system to perform operations including obtaining a data stream including a sequence of video frames and a sequence of audio samples. The at least one processor may also be configured to cause the system to perform operations including inputting the sequence of video frames into a video channel, and including inputting the sequence of audio samples into an audio channel for processing. The sequence of video frames may be processed in the video channel and outputted from the video channel. The audio channel may include a data buffer configured to buffer processed audio samples. A volume threshold of the data buffer may be determined according to a time for processing one or more successive video frames of the sequence of video frames. The one or more successive video frames may correspond to the buffered audio samples. The at least one processor may be further configured to cause the system to perform operations including determining that a data volume of audio samples buffered in the data buffer exceeds the volume threshold, and in response to a determination that the data volume of the buffered audio samples exceeds the volume threshold of the data buffer, outputting the buffered audio samples from the audio channel.

In some embodiments, the volume threshold of the data buffer may be equal to a data volume of audio samples that needs to be buffered when one video frame in the video channel is processed.

In some embodiments, the at least one processor may be further configured to cause the system to perform additional operations including receiving one or more output instructions for outputting audio samples, and in response to the determination that the data volume of the buffered audio samples exceeds the volume threshold of the data buffer, outputting the buffered audio samples from the audio channel based on the one or more received output instructions.

In some embodiments, the at least one processor may be further configured to cause the system to perform additional operations including determining a time difference between a first time for processing a first group of successive video frames and a second time for processing a second group of successive video frames. A frame count of the first group of successive video frames may be same as a frame count of the second group of successive video frames. The first group of successive video frames may include video frames to be processed and the second group of successive video frames may include processed video frames. The at least one processor may also be configured to cause the system to perform additional operations including in response to a determination that the time difference is greater than a first time threshold, increasing the volume threshold of the data buffer; or in response to a determination that the time difference is less than a second time threshold, decreasing the volume threshold of the data buffer.

In some embodiments, the second time threshold may be equal to the first time threshold.

In some embodiments, increasing the volume threshold of the data buffer, the at least one processor may be configured to cause the system to perform additional operations including: designating a second data volume of audio samples corresponding to the time difference as an increment of the volume threshold; determining whether the increment of the volume threshold exceeds a data volume of audio samples corresponding to one video frame; and in response to a determination that the increment of the volume threshold is less than the data volume of audio samples corresponding to one video frame, determining an updated volume threshold by increasing the volume threshold by the increment of the volume threshold.

In some embodiments, the at least one processor may be further configured to cause the system to perform additional operations including in response to a determination that the increment of the volume threshold exceeds the data volume of audio samples corresponding to one video frame, discarding one video frame when the first group of successive video frames are outputted from the video channel.

In some embodiments, the discarded video frame may be an unprocessed video frame.

In some embodiments, decreasing the volume threshold of the data buffer, the at least one processor may be configured to cause the system to perform additional operations including: designating a third data volume of audio samples corresponding to the time difference as a decrement of the volume threshold; determining whether the decrement of the volume threshold exceeds a data volume of audio samples corresponding to one video frame; and in response to a determination that the decrement of the volume threshold is less than the data volume of audio samples corresponding to one video frame, determining an updated volume threshold by decreasing the volume threshold by the decrement of the volume threshold.

In some embodiments, the at least one processor may be further configured to cause the system to perform additional operations including in response to a determination that the decrement of the volume threshold exceeds the data volume of audio samples corresponding to one video frame, copying one video frame when the first group of successive video frames are outputted from the video channel.

In some embodiments, the copied video frame may be a processed video frame.

In some embodiments, the data buffer further may include a second volume threshold and third volume threshold. The second volume threshold and/or the third volume threshold may relate to the volume threshold and a time for transmitting or displaying one video frame.

In some embodiments, the at least one processor may be configured to cause the system to perform additional operations including obtaining an input rate of at least a portion of the sequence of video frames inputted into the video channel and an output rate of the at least a portion of the sequence of video frames outputted from the video channel; and determining whether the input rate is greater than the output rate.

In some embodiments, the at least one processor may be further configured to cause the system to perform additional operations including in response to a determination that the input rate is greater than the output rate, determining whether a data volume of audio samples buffered in the data buffer exceeds the third volume threshold; and in response to a determination that the data volume of the audio samples buffered in the data buffer exceeds the third volume threshold, deleting a portion of the audio samples such that a data volume of the audio samples remaining in the data buffer does not exceed the second volume threshold.

In some embodiments, the at least one processor may be further configured to cause the system to perform additional operations including in response to a determination that the input rate is less than the output rate, determining whether a data volume of audio samples buffered in the data buffer is less than the volume threshold; and in response to a determination that the data volume of the audio samples buffered in the data buffer is less than the volume threshold, pausing outputting audio samples from the data buffer such that a data volume of audio samples remaining in the data buffer is not less than the second volume threshold.

In another aspect of the present disclosure, a method for synchronizing audio and video is provided. The method may be implemented on a computing device having at least one processor, at least one computer-readable storage medium, and a communication platform connected to a network. The method may include obtaining a data stream including a sequence of video frames and a sequence of audio samples. The method may also include inputting the sequence of video frames into a video channel, and inputting the sequence of audio samples into an audio channel for processing. The sequence of video frames may be processed in the video channel and outputted from the video channel. The audio channel may include a data buffer configured to buffer processed audio samples. A volume threshold of the data buffer may be determined according to a time for processing one or more successive video frames of the sequence of video frames. The one or more successive video frames may correspond to the buffered audio samples. The method may also include determining that a data volume of audio samples buffered in the data buffer exceeds the volume threshold; and in response to a determination that the data volume of the buffered audio samples exceeds the volume threshold of the data buffer, outputting the buffered audio samples from the audio channel.

In yet another aspect of the present disclosure, a non-transitory computer-readable storage medium is provided. The non-transitory computer-readable storage medium may include at least one set of instructions. When executed by at least one processor of a computing device, the at least one set of instructions may direct the at least one processor to perform operations including obtaining a data stream including a sequence of video frames and a sequence of audio samples. The at least one set of instructions may also direct the at least one processor to perform operations including inputting the sequence of video frames into a video channel and inputting the sequence of audio samples into an audio channel for processing. The sequence of video frames may be processed in the video channel and outputted from the video channel. The audio channel may include a data buffer configured to buffer processed audio samples. A volume threshold of the data buffer may be determined according to a time for processing one or more successive video frames of the sequence of video frames. The one or more successive video frames may correspond to the buffered audio samples. The at least one set of instructions may also direct the at least one processor to perform operations including determining that a data volume of audio samples buffered in the data buffer exceeds the volume threshold, and in response to a determination that the data volume of the buffered audio samples exceeds the volume threshold of the data buffer, outputting the buffered audio samples from the audio channel.

In yet another aspect of the present disclosure, a system for synchronizing audio and video is provided. The system may include an acquisition module configured to obtain a data stream including a sequence of video frames and a sequence of audio samples. The system may also include an input module configured to input the sequence of video frames into a video channel and input the sequence of audio samples into an audio channel for processing. The sequence of video frames may be processed in the video channel and outputted from the video channel. The audio channel may include a data buffer configured to buffer processed audio samples. A volume threshold of the data buffer may be determined according to a time for processing one or more successive video frames of the sequence of video frames. The one or more successive video frames may correspond to the buffered audio samples. The system may also include a determination module configured to determine that a data volume of audio samples buffered in the data buffer exceeds the volume threshold. The system may further include an output module configured to, in response to a determination that the data volume of the buffered audio samples exceeds the volume threshold of the data buffer, outputting the buffered audio samples from the audio channel.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
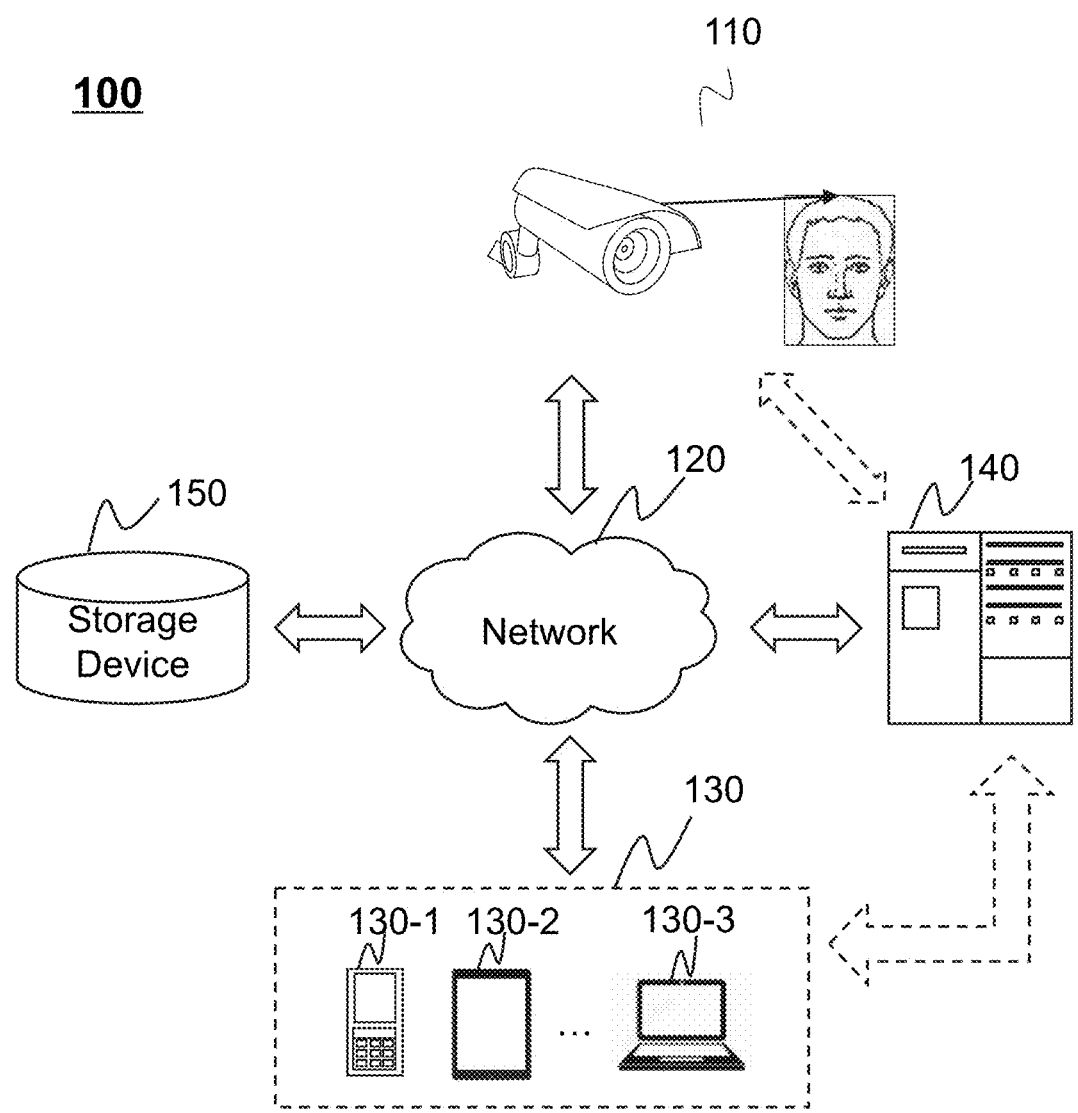
FIG. 1 is a schematic diagram illustrating an exemplary multimedia content processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure relates to systems and methods for synchronizing audio and video. The systems and methods may obtain a data stream including a sequence of video frames and a sequence of audio samples. The systems and methods may input the sequence of video frames into a video channel, and input the sequence of audio samples into an audio channel for processing synchronously. The sequence of video frames may be processed in the video channel. At the same time, the processed audio samples may be buffered in a data buffer of the audio channel. A volume threshold of the data buffer may be determined according to a time for processing one or more successive video frames of the sequence of video frames. The one or more successive video frames may correspond to the buffered audio samples. The systems and methods may also determine whether a data volume of audio samples buffered in the data buffer exceeds the volume threshold. In response to a determination that the data volume of the buffered audio samples exceeds the volume threshold of the data buffer, the systems and methods may output the buffered audio samples from the audio channel. At the same time, the processed video frames may be outputted from the video channel. In some embodiments of the present disclosure, buffering processed audio samples in the data buffer may allow time for processing video frame(s) corresponding to the processed audio samples, which may achieve the synchronous output of audio and video.

In some embodiments, to ensure the synchronization of audio and video, the influence of cumulative frequency differences on the synchronization of audio and video is considered. The systems and methods may also determine a time difference between a first time for processing a first group of successive video frames (e.g., n successive video frames to be processed) and a second time for processing a second group of successive video frames (e.g., n processed successive video frames). If the time difference is greater than a first time threshold (e.g., 0), the systems and methods may increase the volume threshold of the data buffer to compensate the increased time for processing video frames. If the time difference is less than a second time threshold (e.g., 0), the systems and methods may decrease the volume threshold of the data buffer to compensate the decreased time for processing video frames.

In some embodiments, the influence of a rate difference of an input rate of video frame(s) and an output rate of video frame(s) on the data volume of buffered audio samples is considered. The systems and methods may determine whether the input rate is equal to the output rate. If the input rate is greater than the output rate and a data volume of audio samples buffered in the data buffer exceeds a third volume threshold, the systems and methods may delete a portion of the audio samples such that a data volume of the audio samples remaining in the data buffer does not exceed a second volume threshold. If the input rate is less than the output rate and a data volume of audio samples buffered in the data buffer is less than the volume threshold, the systems and methods may pause outputting audio samples from the data buffer such that a data volume of audio samples remaining in the data buffer is not less than the second volume threshold.

FIG. 1 is a schematic diagram illustrating an exemplary multimedia content processing system 100 according to some embodiments of the present disclosure. The multimedia content processing system 100 may be configured for synchronizing audio and video in multimedia contents. The multimedia content processing system 100 may include a capture device 110, a network 120, a terminal 130, a processing device 140, and a storage device 150. The components of the multimedia content processing system 100 may be connected to each other in one or more of various ways. Merely by way of example, as illustrated in FIG. 1, the capture device 110 may be connected to the processing device 140 via the network 120. As another example, the capture device 110 may be connected to the processing device 140 directly as indicated by the bi-directional arrow in dotted lines linking the capture device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

The capture device 110 may be configured to capture one or more types of multimedia contents. The multimedia content(s) may include motion pictures, television broadcasts, movie playbacks, etc. The multimedia content(s) may include audio and video components. In some embodiments, the multimedia content(s) may be arranged in the form of streamed content(s) including packets or frames of video and audio data. In some embodiments, the video data may be supplied to a video channel for subsequent display by a video display (e.g., a display screen of the terminal 130), and the audio data may be supplied to an audio channel for play over an audio player (e.g., a loudspeaker of the terminal 130). The capture device 110 may be or include one or more cameras. In some embodiments, the capture device 110 may be a digital camera, a video camera, a security camera, a web camera, a smartphone, a tablet, a laptop, a video gaming console equipped with a web camera, a camera with multiple lenses, a camcorder, etc.

The network 120 may facilitate the exchange of information and/or data. In some embodiments, one or more components of the multimedia content processing system 100 (e.g., the capture device 110, the terminal 130, the processing device 140, the storage device 150) may send information and/or data to another component(s) in the multimedia content processing system 100 via the network 120. For example, the processing device 140 may process an image obtained from the capture device 110 via the network 120. As another example, the capture device 110 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the multimedia content processing system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a HoloLens™, a Gear VR™, etc. In some embodiments, the terminal 130 may remotely operate the capture device 110. In some embodiments, the terminal 130 may operate the capture device 110 via a wireless connection. In some embodiments, the terminal 130 may receive information and/or instructions inputted by a user, and send the received information and/or instructions to the capture device 110 or to the processing device 140 via the network 120. In some embodiments, the terminal 130 may be part of the processing device 140. In some embodiments, the terminal 130 may be omitted.

In some embodiments, the processing device 140 may process data obtained from the capture device 110, the terminal 130, or the storage device 150. For example, the processing device 140 may acquire a multimedia data stream including a sequence of video frames and a second of audio samples. As another example, the processing device 140 may process the sequence of video frames and/or the sequence of audio samples. The processing device 140 may output the processed video frames and processed audio samples to the terminal 130 synchronously. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local to or remote from one or more other components of the multimedia content processing system 100. For example, the processing device 140 may access information and/or data stored in the capture device 110, the terminal 130, and/or the storage device 150 via the network 120. As another example, the processing device 140 may be directly connected to the capture device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may store data and/or instructions. In some embodiments, the storage device 150 may store data or images obtained from the capture device 110, the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the multimedia content processing system 100 (e.g., the capture device 110, the terminal 130, the processing device 140). One or more components in the multimedia content processing system 100 may access the data or instructions stored in the storage device 150 via the network 120. In some embodiments, the storage device 150 may be directly connected to or communicate with one or more components in the multimedia content processing system 100 (e.g., the capture device 110, the terminal 130, the processing device 140). In some embodiments, the storage device 150 may be part of the capture device 110, or the processing device 140.

Figure 2:
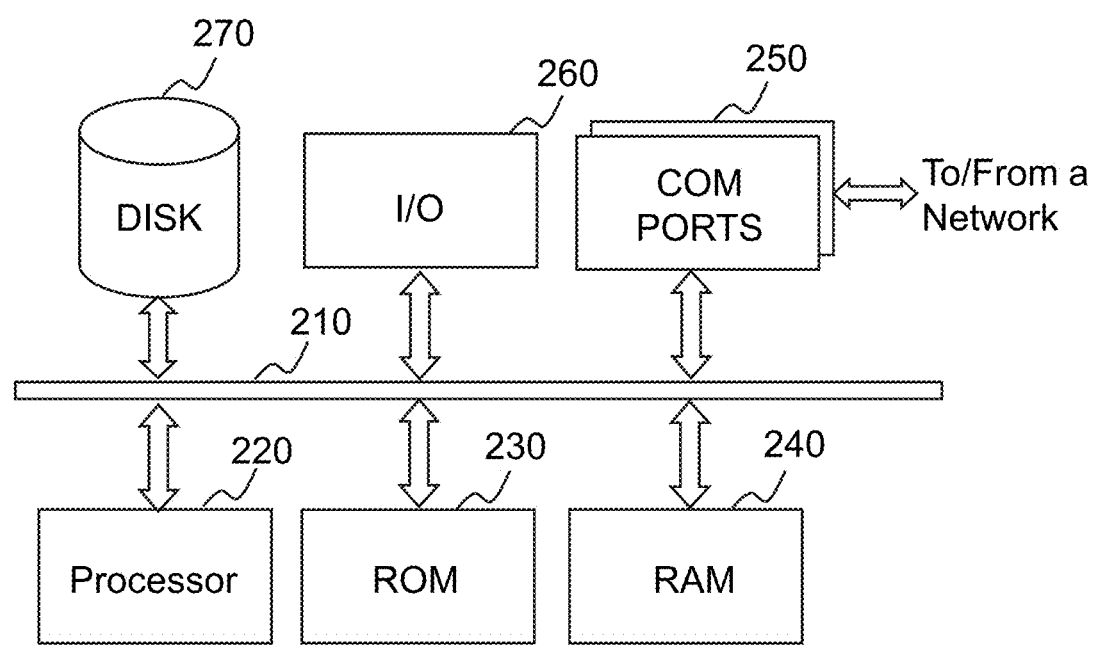
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the capture device 110, the terminal 130, the processing device 140 may be implemented on the computing device 200. For example, the processing device 140 may be implemented on the computing device 200 and configured to perform functions of the processing device 140 disclosed in this disclosure.

The computing device 200 may be a special purpose computer used to implement a multimedia content processing system for the present disclosure. The computing device 200 may be used to implement any component of the multimedia content processing system as described herein. For example, the processing device 140 may be implemented on the computing device, via its hardware, software program, firmware, or a combination thereof. Although only one such computer is shown, for convenience, the computer functions relating to the image processing as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or other type of non-transitory storage medium to be executed by the processor 220. The method and/or process of the present disclosure may be implemented as the program instructions. The computing device 200 also includes an I/O device 260 that may support the input and/or output of data flows between the computing device 200 and other components. The computing device 200 may also receive programs and data via the communication network.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
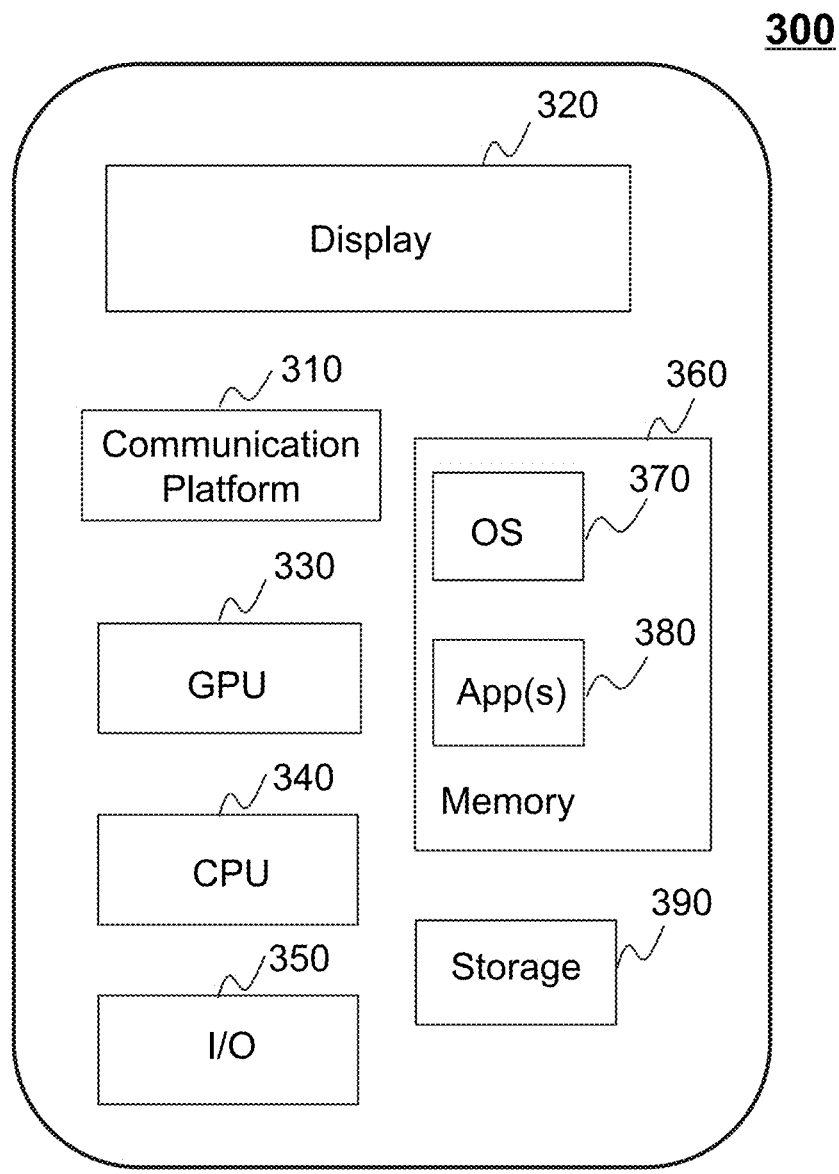
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the mobile device 300 may be an exemplary embodiment corresponding to the terminal 130. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the multimedia content processing system 100. User interactions with the information stream may be achieved via the I/O 350 and provided to the storage device 150, the capture device 110 and/or other components of the multimedia content processing system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
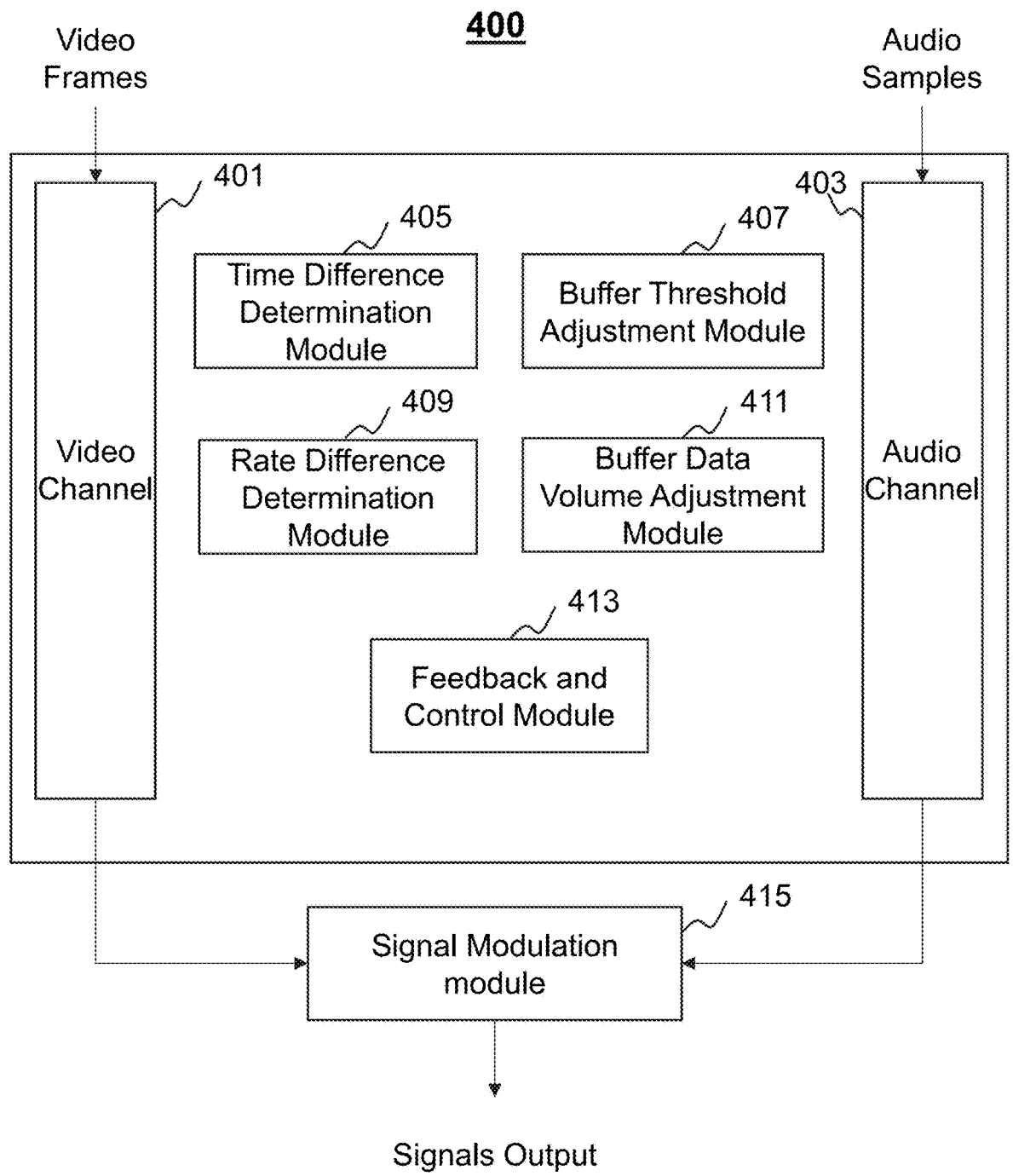
FIG. 4 is an exemplary architecture of a system for implementing the synchronization of audio and video according to some embodiments of the present disclosure.

FIG. 4 is an exemplary architecture of a system for implementing the synchronization of audio and video according to some embodiments of the present disclosure.

The system 400 may include a video channel 401 and an audio channel 403. A sequence of video frames may be inputted into the video channel 401 for processing. A sequence of audio samples may be inputted into the audio channel 403 for processing. The video channel 401 may include one or more video processing modules configured to process the inputted video frame(s). The audio channel 403 may include one or more audio processing modules configured to process the inputted audio sample(s). The audio channel 403 may also include a data buffer configured to buffer processed audio sample(s). In some embodiments, a time for processing audio sample(s) may be greatly less than a time for processing corresponding video frame(s), and thus, the time for processing audio sample(s) may be considered negligible compared to the time for processing corresponding video frame(s). To ensure the synchronization of video and audio, the processed audio sample(s) may not be directly outputted from the audio channel but buffered in the data buffer. The data buffer may include a first input first output (FIFO) buffer, a dual port random access memory (RAM), or the like. In some embodiments, a volume threshold may be set for the data buffer. When a data volume of audio samples buffered in the data buffer is less than the volume threshold, additional audio sample(s) may be inputted in the data buffer while no audio sample may be outputted from the data buffer. When the data volume of audio samples buffered in the data buffer reaches the volume threshold, additional audio sample(s) may be continually inputted in the data buffer and the buffered audio sample(s) may be outputted from the data buffer.

The system 400 may also include a time difference determination module 405 and a buffer threshold adjustment module 407. The time difference determination module 405 may be configured to determine a time difference between a first time for processing a first group of successive video frames (e.g., n successive video frames to be processed) and a second time for processing a second group of successive video frames (e.g., n processed successive video frames). Merely by way of example, if the time difference is not equal to 0, the time difference determination module 405 may send a threshold adjustment instruction to the buffer threshold adjustment module 407. The buffer threshold adjustment module 407 may, in response to the threshold adjustment instruction, adjust the volume threshold of the data buffer to ensure, achieve, or improve the synchronization of audio and video. Details regarding the adjustment of the volume threshold may be found elsewhere in the present disclosure (e.g., FIG. 7A and the descriptions thereof).

The system 400 may further include a rate difference determination module 409 and a buffer data volume adjustment module 411. The rate difference determination module 409 may be configured to determine a rate difference between an input rate of video frames inputted into the video channel and an output rate of the video frames outputted from the video channel. Merely by way of example, if the rate difference is not equal to 0, the rate difference determination module 409 may send a data volume adjustment instruction to the buffer data volume adjustment module 411. The buffer data volume adjustment module 411 may, in response to the data volume adjustment instruction, adjust the data volume of audio samples buffered in the data buffer such that a data volume of audio samples remaining in the data buffer within a range threshold (e.g., within a first volume threshold and a third volume threshold). Details regarding the adjustment of the data volume of buffered audio samples may be found elsewhere in the present disclosure (e.g., FIG. 9 and the descriptions thereof).

The system 400 may further include a feedback and control module 413. The feedback and control module 413 may be configured to detect the working status of the buffer threshold adjustment module 407 and the buffer data volume adjustment module 411. For example, the feedback and control module 413 may determine the data volume of audio samples buffered in the data buffer, the volume threshold of the data buffer, a count of the occurrences that the data volume of buffered audio samples exceeds the volume threshold, or the like. In some embodiments, if an abnormal signal is detected, (e.g., the count of the occurrences that the data volume of buffered audio samples exceeds the volume threshold is greater than a preset value), the feedback and control module 413 may pause outputting the audio samples from the audio channel and the video frames from the video channel.

The system 400 may further include a signal modulation module 415. The signal modulation module 415 may be configured to modulate the outputted audio samples and video frames to generate complex signals. In some embodiments, the complex signals may include digital signals, analog signals, or the like. The modulation may include phase modulation, frequency modulation, amplitude modulation, amplitude-shift keying (ASK), phase-shift keying (PSK), quadrature amplitude modulation (QAM), frequency-shift keying (FSK), orthogonal frequency division multiplexing (OFDM), or the like, or any combination thereof. Then the complex signals may then be outputted.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more modules in the system 400 may run in parallel. For example, when the time difference determination module 405 and the buffer threshold adjustment module 407 determines the time difference and adjust the volume threshold of the data buffer, the rate difference determination module 409 and the buffer data volume adjustment module 411 may determine the rate difference and adjust the data volume of buffered audio samples. At the same time, the feedback and control module 413 may monitor and adjust the working status of the buffer threshold adjustment module 407 and the buffer data volume adjustment module 411.

Figure 5:
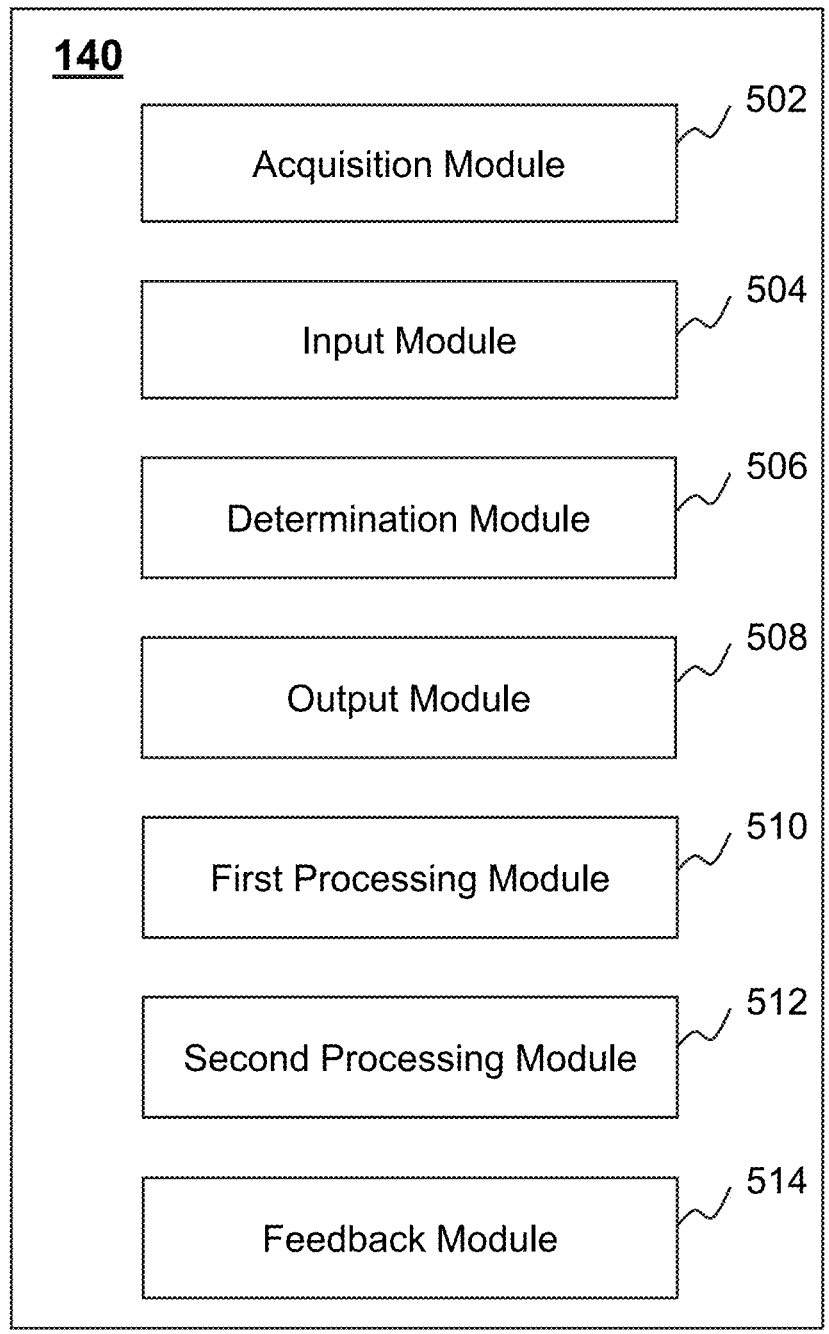
FIG. 5 is a block diagram illustrating an exemplary processing device according to some embodiments of the present disclosure.

FIG. 5 is a block diagram illustrating an exemplary processing device 140 according to some embodiments of the present disclosure. The processing device 140 may include an acquisition module 502, an input module 504, a determination module 506, an output module 508, a first processing module 510, a second processing module 512, and a feedback module 514. The modules may be hardware circuits of all or part of the processing device 140. The modules may also be implemented as an application or set of instructions read and executed by the processing device 140. Further, the modules may be any combination of the hardware circuits and the application/instructions. For example, the modules may be the part of the processing device 140 when the processing device 140 is executing the application/set of instructions. In some embodiments, the exemplary system 400 may be implemented on the processing device 140.

The acquisition module 502 may be configured to obtain information and/or data related to the multimedia content processing system 100. In some embodiments, the acquisition module 502 may obtain a data stream including a sequence of video frames and a sequence of audio samples. In some embodiments, the data stream may include multimedia data, which needs to be separated into video frames and audio samples before being input a video channel and an audio channel, respectively. Alternatively, the data stream may include separate video frames and audio samples, which can directly be inputted into the video channel and the audio channel, respectively. In some embodiments, a video frame may correspond to one or more audio samples. Here, "correspond to" may refer to a condition that the video frame and the audio sample(s) are collected at the substantially same time. In some embodiments, the acquisition module 502 may obtain the data stream from one or more components of the multimedia content processing system 100, such as the capture device 110, the terminal 130, a storage device (e.g., the storage device 150), or the like, or any combination thereof. Alternatively or additionally, the acquisition module 502 may obtain the data stream from an external source (e.g., a cloud disk) via the network 120.

The input module 504 may be configured to input video data into a video channel and audio data into an audio channel. In some embodiments, the input module 504 may input the sequence of video frames into a video channel and the sequence of audio samples into an audio channel simultaneously. In some embodiments, the sequence of video frames may be processed by one or more video processing modules in the video channel orderly. Similarly, the sequence of audio samples may be processed by one or more audio processing modules in the audio channel orderly. In some embodiments, the audio channel may include a data buffer configured to buffer the processed audio samples. A volume threshold of the data buffer may be determined according to a time for processing one or more successive video frames. Details regarding the volume threshold of the data buffer may be found elsewhere in the present disclosure (e.g., operation 605 and the descriptions thereof).

The determination module 506 may be configured to determine whether a data volume of audio samples buffered in the data buffer exceeds the volume threshold of the data buffer. In response to a determination that the data volume of audio samples buffered in the data buffer exceeds the volume threshold of the data buffer, additional audio samples may be continually buffered in the data buffer and the buffered audio samples may be outputted from the data buffer orderly. In response to a determination that the data volume of audio samples buffered in the data buffer does not exceed the volume threshold of the data buffer, additional audio samples may be continually buffered in the data buffer while the buffered audio samples may not be outputted from the data buffer.

The output module 508 may be configured to output the processed video frame(s) from the video channel orderly. The output module 508 may also be configured to output the buffered audio sample(s) from the audio channel orderly. In some embodiments, the output module 508 may receive one or more output instructions for outputting audio samples. When the data volume of the buffered audio samples exceeds the volume threshold, the output module 508 may output the buffered audio samples from the audio channel based on the received output instructions. The outputted video frame(s) may correspond to the outputted audio sample(s). Specially, when the outputted video frame(s) is displayed, the corresponding outputted audio sample(s) may be played simultaneously.

The first processing module 510 may be configured to adjust the volume threshold of the data buffer. In some embodiments, the first processing module 510 may correspond to the time difference determination module 405 and/or the buffer threshold adjustment module 407 of the system 400. In some embodiments, the first processing module 510 may determine a time difference between a first time for processing a first group of successive video frames (e.g., n successive video frames to be processed) and a second time for processing a second group of successive video frames (e.g., n processed successive video frames). If the time difference is greater than a first threshold (e.g., 0), the first processing module 510 may increase the volume threshold of the data buffer according to the time difference. If the time difference is less than a second threshold (e.g., 0), the first processing module 510 may decrease the volume threshold of the data buffer according to the time difference. Details regarding the adjustment of the volume threshold of the data buffer may be found elsewhere in the present disclosure (e.g., FIG. 7A and the descriptions thereof).

The second processing module 512 may be configured to adjust a data volume of audio samples buffered in the data buffer. In some embodiments, the second processing module 512 may correspond to the rate difference determination module 409 and/or the buffer data volume adjustment module 411 of the system 400. In some embodiments, the second processing module 512 may determine a rate difference between an input rate of video frames inputted into the video channel and an output rate of the video frames outputted from the video channel. If the input rate is greater than the output rate and a data volume of audio samples buffered in the data buffer exceeds a third volume threshold, the second processing module 512 may delete a portion of the audio samples such that a data volume of the audio samples remaining in the data buffer does not exceed a second volume threshold. If the input rate is less than the output rate and a data volume of audio samples buffered in the data buffer is less than the volume threshold, the second processing module 512 may pause outputting audio samples from the data buffer such that a data volume of audio samples remaining in the data buffer is not less than the second volume threshold. Details regarding the adjustment of the data volume of buffered audio samples may be found elsewhere in the present disclosure (e.g., FIG. 9 and the descriptions thereof).

The feedback module 514 may be configured to detect the working status of one or more components of the processing device 140. In some embodiments, the feedback module 514 may correspond to the feedback and control module 413 of the system 400. In some embodiments, the feedback module 514 may detect the working status of the first processing module 510 and/or the second processing module 512. For example, the feedback module 514 may determine the data volume of audio samples buffered in the data buffer, the volume threshold of the data buffer, a count of the occurrences that the data volume of buffered audio samples exceeds the volume threshold, or the like. Merely by way of example, if an abnormal signal is detected, (e.g., the count of the occurrences that the data volume of buffered audio samples exceeds the volume threshold is greater than a preset value), the feedback module 514 may pause outputting the audio samples from the audio channel and the video frames from the video channel.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, a single module may be divided into two or more units. For example, the input module 504 may be divided into a first input unit and a second input unit. The first input unit may be configured to input video frame(s) and the second input unit may be configured to input audio frame(s). In some embodiments, the processing device 140 may further include one or more additional modules. For example, the processing device 140 may further include a storage module (not shown in FIG. 4) configured to store data generated by the modules of the processing device 140.

Figure 6:
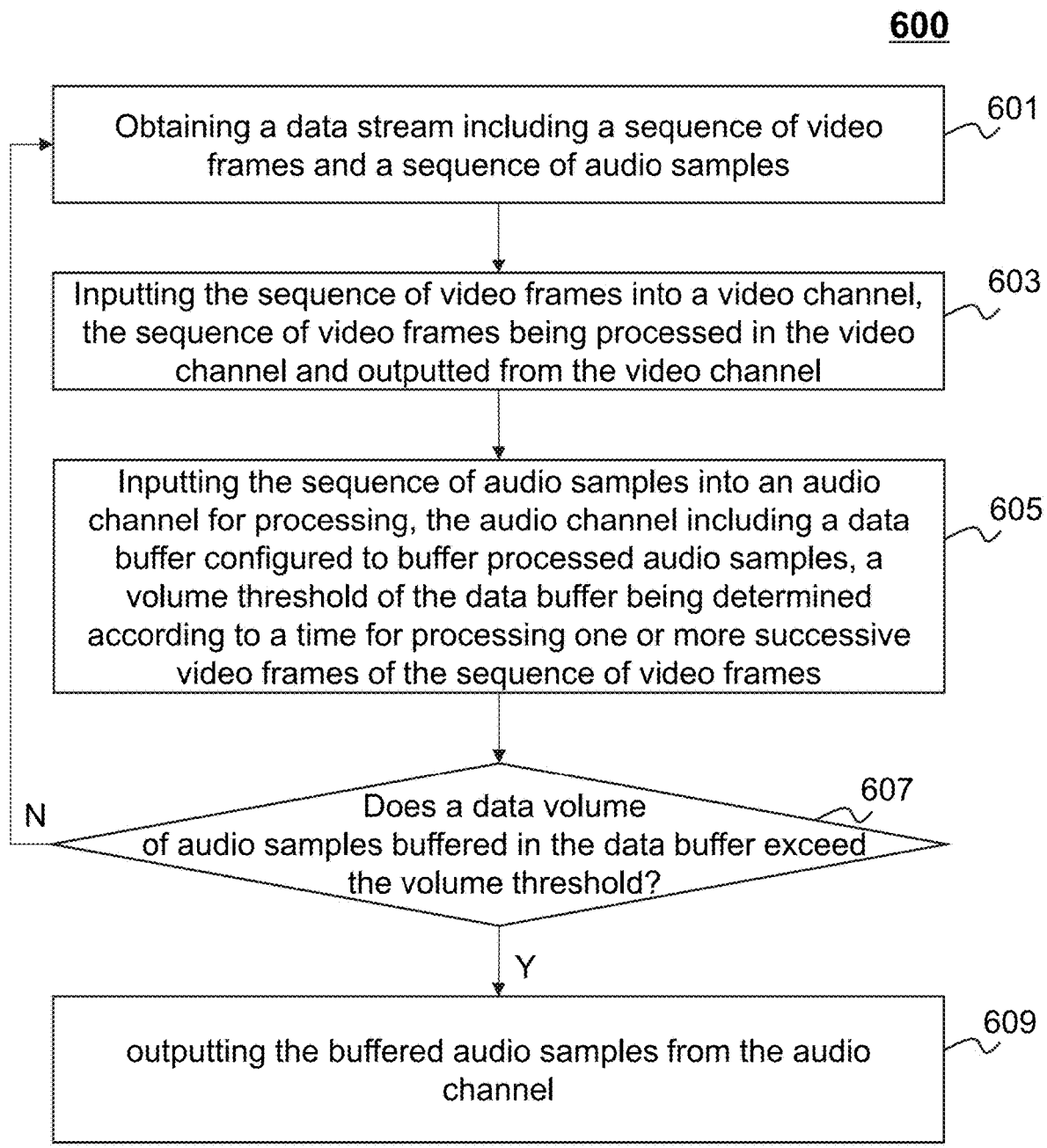
FIG. 6 is a flowchart illustrating an exemplary process for implementing the synchronization of audio and video according to some embodiments of the present disclosure.

FIG. 6 is a flowchart illustrating an exemplary process for implementing the synchronization of audio and video according to some embodiments of the present disclosure. For illustration purpose only, the processing device 140 may be described as a subject to perform the process 600.

However, one of ordinary skill in the art would understand that the process 600 may also be performed by other entities. For example, one of ordinary skill in the art would understand that at least a portion of the process 600 may also be implemented on the computing device 200 as illustrated in FIG. 2 or the mobile device 300 as illustrated in FIG. 3. In some embodiments, one or more operations of process 600 may be implemented in the multimedia content processing system 100 as illustrated in FIG. 1. In some embodiments, one or more operations in the process 600 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in a form of electronic current or electrical signals.

In 601, the processing device 140 (e.g., the acquisition module 502) may obtain a data stream including a sequence of video frames and a sequence of audio samples. In some embodiments, the data stream may include combined video and audio data (also referred to as multimedia data), which is merged by a multiplexer. In this case, the data stream may be separated, by a demultiplexer, into video data and audio data before being input into a video channel and an audio channel, respectively. Alternatively, the data stream may include separate video data and audio data, which can directly be inputted into the video channel and the audio channel, respectively.

In general, considering the occurrence time of an event captured in video and audio, a correspondence relationship between video data and audio data may exist. For example, video data (e.g., a video signal) may have accompanying or corresponding audio data (e.g., an audio signal). In some embodiments, video data may be expressed as video frame(s). Video frames may refer to individual frames of images or pictures including video data to be displayed at a selected rate. For example, 30 video frames may be displayed per second. In some embodiments, audio data (also referred to as audio samples) may be grouped into blocks or groups. In some embodiments, a video frame may correspond to one or more audio samples that are treated as an audio frame. Merely by way of example, there may be 48,000 audio samples and 30 video frames per second. A video frame may essentially occupy ⅟₃₀ seconds, and an audio frame may be defined as the corresponding 1,600 audio samples that are played during the display of the video frame. It should be noted that the above description is merely for illustration purposes, and is not intended to limit the scope of the present disclosure. In some embodiments, due to different encoding formats of audio, one audio frame may include another number or count of audio samples.

In some embodiments, the processing device 140 may obtain the data stream from one or more components of the multimedia content processing system 100, such as the capture device 110, the terminal 130, a storage device (e.g., the storage device 150), or the like, or any combination thereof. Alternatively or additionally, the processing device 140 may obtain the data stream from an external source (e.g., a cloud disk) via the network 120.

In some embodiments, in order to satisfy the bandwidth requirements of transmitting video data, the video data may be encoded or compressed. In some embodiments, a plurality of groups of pictures (GOPs) may be generated by encoding the video data, e.g., by an encoder. A group of pictures (GOP) may include different formats of frames, such as I-frames, P-frames, B-frames. I-frame may store a complete picture of video content. P-frame may store only information that is different from the preceding frame. B-frame may store only information that is different from the preceding frame and the following frame. The encoded video data may retain the sequential order of the original video data before the encoding. When inputted into the video channel, the encoded video frames need to be decoded or processed. It shall be understood the use of P-frames and B-frames may provide an efficient mechanism for compressing the video data, but may also increase the complexity of decoding the video data. Thus, the processing/decoding of the encoded video data may generally take a quite longer time than that of the encoded audio data. Similarly, audio data may be encoded or compressed to reduce the data volume when being transmitted. The encoded audio data may retain the sequential order of the original audio data before the encoding. When inputted into the audio channel, the encoded audio frames or samples need to be decoded or processed.

In 603, the processing device 140 (e.g., the input module 504) may input the sequence of video frames into a video channel. The sequence of video frames may be processed in the video channel and then outputted from the video channel. In some embodiments, the video channel may include one or more video processing modules configured to perform video decoding, denoising, etc. A video frame may be processed by the video processing module(s). On account of the time sequence of an event captured in video frames, the sequence of video frames may be processed and outputted orderly. Merely by way of example, a first video frame inputted into the video channel at a first time point may be processed by the video processing module(s) first, and then a second video frame inputted into the video channel at a second time point (after the first time point) may then be processed by the video processing module(s). The processed first video frame may be outputted from the video channel first, and the processed second video frame may be outputted from the video channel subsequently. The arrangement may be referred to as first-in, first-out (FIFO).

In 605, the processing device 140 (e.g., the input module 504) may input the sequence of audio samples into an audio channel for processing. It should be noted that operations 603 and 605 may be performed simultaneously. Similarly, the sequence of audio samples may be processed by one or more audio processing modules orderly. The audio channel may include a data buffer configured to buffer processed audio samples. In some embodiments, the time for processing audio data may be greatly less than the time for processing video data, in order to ensure the synchronization of video and audio, the processed audio samples may not be directly outputted from the audio channel once processed but buffered in the data buffer. In some embodiments, since the processing of the audio sample(s) in the audio channel takes much less time than the processing of the video frame(s) in the video channel, the time for processing the audio sample(s) may be deemed negligible in some embodiments of the present disclosure. The time for processing the video frame(s) may be compensated by the time during which processed audio samples corresponding to the video frame(s) is buffered in the data buffer.

In some embodiments, the time for processing one video frame may be substantially constant. A volume threshold of the data buffer may be determined according to the time for processing one or more successive video frames of the sequence of video frames. The one or more successive video frames may correspond to the buffered audio samples. Here, "correspond to" may refer to a condition that, when the one or more successive video frames are displayed, the buffered audio samples may be played substantially synchronously. It is not necessary to maintain an absolute synchronization between the one or more successive video frames and the buffered audio samples. For example, the buffered audio samples may include one or more audio samples that are not output for play when the one or more successive video frames are displayed.

Merely by way of example, the volume threshold of the data buffer may be equal to the data volume of audio samples that needs to be buffered when one video frame in the video channel is processed. Here, "audio samples that needs to be buffered" may refer to audio samples buffered in the data buffer during the time for processing the corresponding video frame. In some embodiments, the processing device 140 may determine a time for processing one video frame, that is, the time elapsed from inputting a video frame into the video channel to outputting the video frame (e.g., after the video frame is processed) from the video channel. The time for processing one video frame may depend on the processing time(s) of the video processing module(s). The processing times may be different for different video standards (e.g., PAL video, NTSC video). In some embodiments, for a certain video standard (e.g., PAL video), the time for processing one video frame may be determined according to Equation (1) as below:

$$T_0 = \sum_{i=1}^{N} \frac{cnt_v^i}{f_{vps}^i}, \qquad (1)$$

where N refers to the total count of video processing modules; i refers to the ith video processing module; $cnt_v^i$ refers to the count of clocks of the ith video processing module; $f_{vps}^i$ refers to the clock rate of the ith video processing module; and $T_0$ refers to the time for processing one video frame.

The volume threshold of the data buffer may be determined based on the time for processing one video frame. For example, the volume threshold of the data buffer may be determined according to Equation (2) as below:

$$TH_0 = cap_0 = S_a \times N \times T_0, \qquad (2)$$

where $S_a$ refers to a sampling rate of audio samples; N refers to bits occupied by audio samples collected or captured by the capture device 110 per unit time (e.g., per second); $cap_0$ refers to a data volume of audio samples buffered within the time $T_0$; and $TH_0$ refers to the volume threshold of the data buffer. In some embodiments, N may be equal to 16.

In some embodiments, the volume threshold of the data buffer may be equal to a data volume of audio samples that needs to be buffered when two or more one video frames in the video channel is processed. That is, the volume threshold of data buffer may be determined based on the time for processing the two or more video frames.

In 607, the processing device 140 (e.g., the determination module 506) may determine whether a data volume of audio samples buffered in the data buffer exceeds the volume threshold. The processed audio samples in the audio channel may be buffered in the data buffer orderly, e.g., in an FIFO order. The data volume of buffered audio samples (denoted as cap) may increase with the buffering of audio samples. The processing device 140 may determine whether the data volume of the buffered audio samples (cap) exceeds the volume threshold ($TH_0$). In response to a determination that the data volume of the buffered audio samples (cap) exceeds the volume threshold ($TH_0$), the processing device 140 may proceed to operation 609.

In 609, the processing device 140 (e.g., the output module 508) may output the buffered audio samples from the audio channel. In some embodiments, the data buffer may include a first input first output (FIFO) buffer, a dual port random access memory (RAM), or the like. When the data volume of buffered audio samples (cap) exceeds the volume threshold ($TH_0$), the processing device 140 may output the buffered audio samples from the audio channel orderly. In some embodiments, audio sample(s) that are first buffered may be first outputted from the audio channel. For example, a first audio sample may be buffered in the data buffer at a first time point, and a second audio sample may be buffered in the data buffer at a next time point. The first audio sample may be outputted first and the second audio sample may be outputted subsequently.

In some embodiments, the processing device 140 may receive one or more output instructions for outputting audio samples. In response to the determination that the data volume of the buffered audio samples (cap) exceeds the volume threshold ($TH_0$), the processing device 140 may output the buffered audio samples from the audio channel based on the one or more output instructions. In some embodiments, the output instruction(s) may be sent by the video processing module(s) of the video channel to ensure the synchronization of audio and video. For example, the video processing module(s) may send the output instruction(s) according to a preset frequency. Merely by way of example, assuming a video frame is output every 10 milliseconds (ms) and a video frame corresponds to 10 audio samples, the preset frequency may be set as 1 ms. That is, the video processing module(s) may send an output instruction every 1 ms. When the video frame is outputted from the video channel, 10 audio samples may be outputted from the audio channel synchronously. It should be noted that the above descriptions of the preset frequency are merely for illustration purposes, and are not intended to limit the scope of the present disclosure.

In some embodiments, audio samples may be continually inputted into the audio channel for processing, the processed audio samples may be continually buffered in the data buffer, and the buffered audio samples may be continually outputted from the audio channel (or the data buffer). At the same time, video frames may be continually inputted into the video channel for processing, and the processed video frames may be continually outputted from the video channel.

In some embodiments of the present disclosure, the data buffer may be used to buffer processed audio samples in the audio channel. The volume threshold of the data buffer may be determined based on the time for processing one or more successive video frames in the video channel. Thus, the buffer time the audio samples remaining in the data buffer may compensate the time for processing corresponding video frame(s), which may achieve the synchronization of audio and video.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may determine whether an abnormal signal is detected. In response to a determination that the abnormal signal is detected, the processing device 140 may pause outputting the audio samples from the audio channel and the video frames from the video channel. In some embodiments, after operation 609, the processing device 140 may modulate the outputted video frames and audio samples to generate complex signals. In some embodiments, the complex signals may include digital signals, analog signals, or the like. The modulation may include phase modulation, frequency modulation, amplitude modulation, amplitude-shift keying (ASK), phase-shift keying (PSK), quadrature amplitude modulation (QAM), frequency-shift keying (FSK), orthogonal frequency division multiplexing (OFDM), or the like, or any combination thereof. The processing device 140 may output the complex signals.

In some embodiments, the time for processing two video frames may not be exactly the same. For example, the time for processing a first video frame may be 0.99999 ms, and the time for processing a second video frame may be 1.00001 ms. For the two video frames, the time difference can be negligible. However, for multiple video frames, the cumulative time difference may become non-negligible, which is referred to as a cumulative frequency difference effect. Under this circumstance, audio and video may become out of synchronization (sync). FIG. 7B shows two conditions that audio and video are out of synchronization. As shown in FIG. 7B, video0 refers to n processed successive video frames. Audio1 refers to a plurality of processed audio samples corresponding to the n processed successive video frames in a first condition. In the first condition, the audio1 lags the video0, and a time difference $\Delta t_n$ exists. Audio2 refers to a plurality of processed audio samples corresponding to the n processed successive video frames in a second condition. In the second condition, the video1 lags the audio2, and a second time difference $\Delta t_n'$ exists. To correct the desynchronization caused by the time difference, the volume threshold of the data buffer may be adjusted, e.g., periodically or when the extent of desynchronization exceeds a threshold.

Figure 7A:
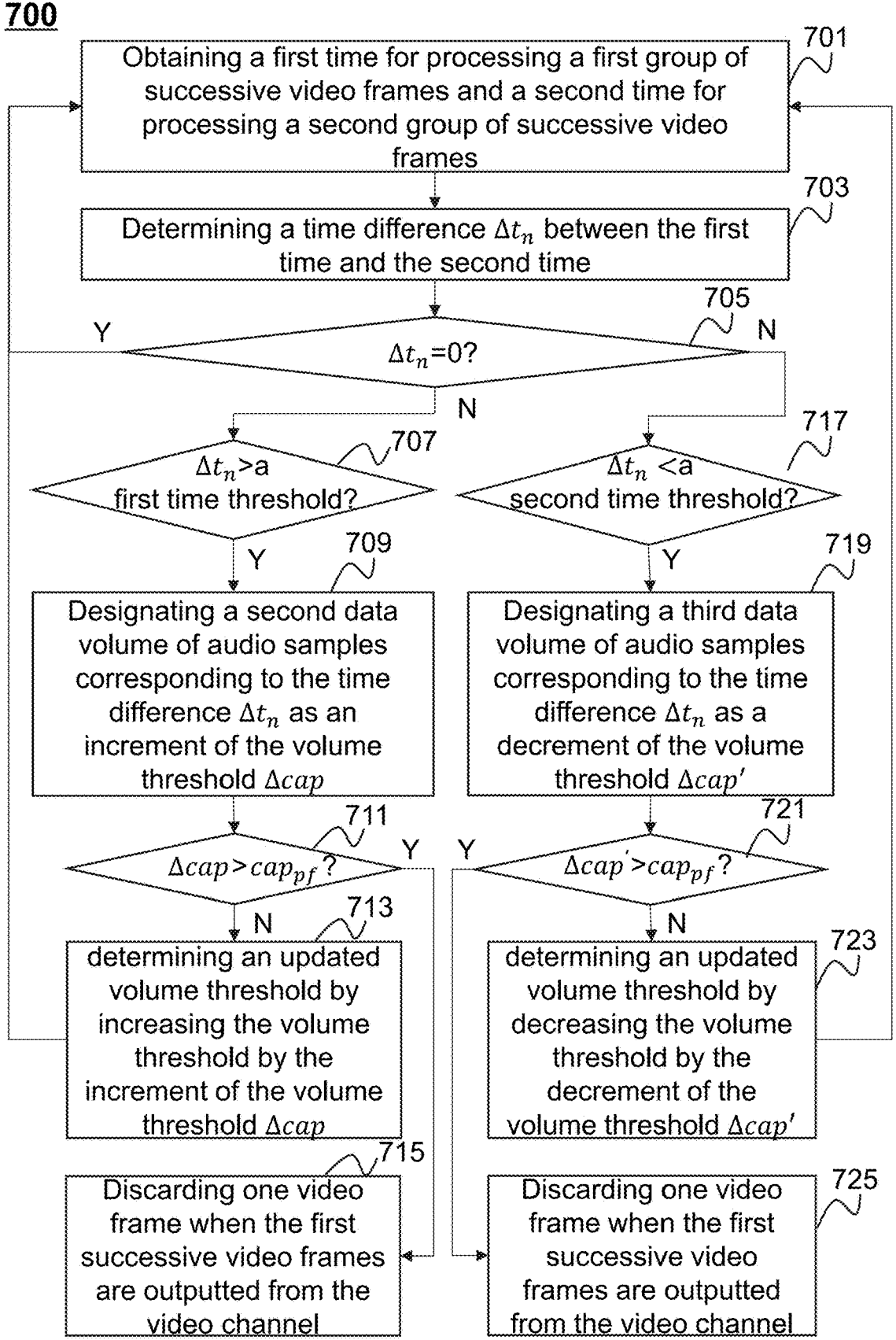
FIG. 7A is a flowchart illustrating an exemplary process for adjusting a volume threshold of a data buffer according to some embodiments of the present disclosure.
Figure 7B:
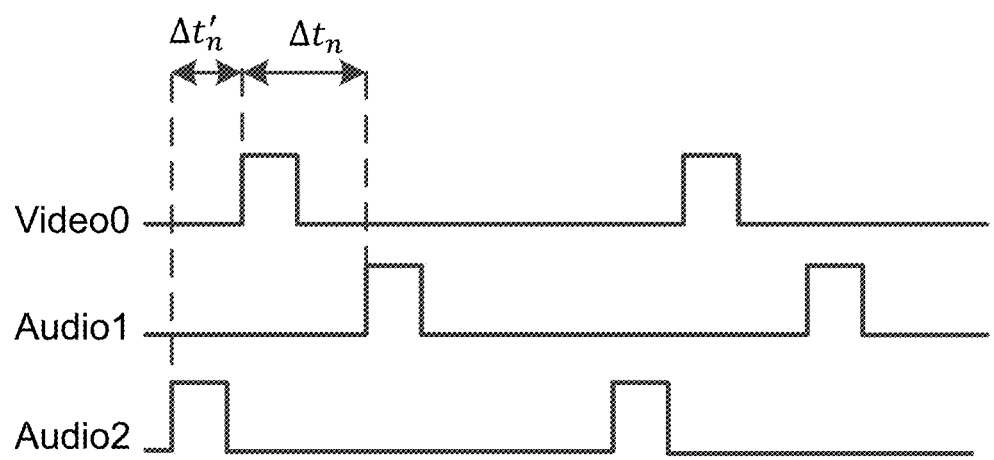
FIG. 7B shows two conditions that audio and video are out of synchronization according to some embodiments of the present disclosure.

FIG. 7A is a flowchart illustrating an exemplary process for adjusting a volume threshold of the data buffer according to some embodiments of the present disclosure. For illustration purpose only, the processing device 140 may be described as a subject to perform the process 700. However, one of ordinary skill in the art would understand that the process 700 may also be performed by other entities. For example, one of ordinary skill in the art would understand that at least a portion of the process 700 may also be implemented on the computing device 200 as illustrated in FIG. 2 or the mobile device 300 as illustrated in FIG. 3. In some embodiments, one or more operations of the process 700 may be implemented in the multimedia content processing system 100 as illustrated in FIG. 1. In some embodiments, one or more operations in the process 700 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in a form of electronic current or electrical signals.

In 701, the processing device 140 (e.g., the first processing module 510) may obtain a first time for processing a first group of successive video frames and a second time for processing a second group of successive video frames. A frame count of the first group of successive video frames may be the same as or different from a frame count of the second group of successive video frames. The first group of successive video frames may include video frames to be processed. The second group of successive video frames may include processed video frames. In some embodiments, the first video frame of the first group of successive video frames may immediately follow the last video frame of the second group of successive video frames. In some embodiments, the processing device 140 may select n successive video frames belonging to the first group (i.e., n video frames to be processed next) and select n successive video frames belonging to the second group (i.e., n video frames just processed) (n is a positive integer). The second time $T_{n2}$ of processing n successive video frames belonging to the second group may be determined by, e.g., a clock in the video channel. Besides, the clock may also record a time deviation (e.g., a linear time deviation from a reference time) when two successive video frames are processed. The first time $T_{n1}$ of processing n successive video frames belonging to the first group may be estimated according to one or more linear time deviations and the clock. Merely by way of example, for a second group of successive video frames including five frames and a first group of successive video frames including five frames, the linear time deviations of the five successive video frames of the second group may be 0.1 ms, 0.2 ms, 0.3 ms, 0.4 ms, and 0.5 ms, respectively. Accordingly, the linear time deviations of the five successive video frames of the first group may be deduced as 0.6 ms, 0.7 ms, 0.8 ms, 0.9 ms, and 1 ms, respectively. Then the processing device 140 may determine the first time for processing the five first successive video frames based on the five linear time deviations and the counter.

In some embodiments, the processing device 140 may obtain the first time $T_{n1}$ and the second time $T_{n2}$ periodically. For example, the obtaining frequency (e.g., the obtaining count per second) of obtaining the first time $T_{n1}$ and the second time $T_{n2}$ may be determined according to Equation (3) as below:

$$f_{th\_refs} = \frac{F_v}{n}, \tag{3}$$

where $F_v$ refers to a frame rate of video (the number of video frames displayed per second); n refers to the frame count of the first (or second) group of successive video frames; and $f_{th\_refs}$ refers to the obtaining frequency of obtaining the first time $T_{n1}$ and the second time $T_{n2}$. In some embodiments, the obtaining frequency $f_{th\_refs}$ may also referred to as a volume threshold updating frequency.

In 703, the processing device 140 (e.g., the first processing module 510) may determine a time difference between the first time $T_{n1}$ and the second time $T_{n2}$. In some embodiments, the processing device 140 may determine the time difference $\Delta T$ according to Equation (4) as below:

$$\Delta T = T_{n1} - T_{n2}. \tag{4}$$

In some embodiments, the processing device 140 may obtain a plurality of first times $T_{n1}$ and a plurality of second times $T_{n2}$ according to the obtaining frequency. The processing device 140 may determine a plurality of time differences between the plurality of first times $T_{n1}$ and its corresponding second times $T_{n2}$ according to Equation (4), and determine a sum of the plurality of time differences as the final time difference $\Delta T$.

In 705, the processing device 140 (e.g., the first processing module 510) may determine whether the time difference $\Delta T$ is equal to zero. In response to a determination that the time difference $\Delta T$ is equal to zero, indicating that processing the first group of successive video frames takes the same amount of time as processing the second group of successive video frames, the processing device 140 may proceed to operation 701, and start a next round. In response to a determination that the time difference ΔT is not equal to zero, the processing device 140 may proceed to operation 707 or operation 717.

In 707, the processing device 140 (e.g., the first processing module 510) may determine whether the time difference ΔT is greater than a first time threshold. The first time threshold may be a real number equal to or greater than 0. In some embodiments, the first time threshold may be 0. In response to a determination that the time difference ΔT is greater than the first time threshold, indicating that processing the first group of successive video frames takes more time than processing the second group of successive video frames, the retention time in the data buffer of one or more audio samples corresponding to the first group of successive vide frames may need to be elongated. Specifically, the processing device 140 may proceed to operation 709.

In 709, the processing device 140 (e.g., the first processing module 510) may designate a second data volume of audio samples corresponding to the time difference ΔT as an increment of the volume threshold. Here, "a second data volume of audio samples corresponding to the time difference ΔT" may refer to a data volume that audio samples are inputted in the data buffer within the time difference ΔT. For example, the processing device 140 may determine the increment of the volume threshold according to Equation (5) as below:

$$\Delta cap = S_a \times N \times \Delta T, \quad (5)$$

where $S_a$ refers to a sampling rate of audio samples; N refers to bits occupied by audio samples collected or captured by the capture device 110 per unit time (e.g., per second); and Δcap refers to the increment of the volume threshold. In some embodiments, N may be equal to 16.

In 711, the processing device 140 (e.g., the first processing module 510) may determine whether the increment of the volume threshold Δcap exceeds a reference data volume. The reference data volume may be the data volume of audio samples corresponding to one video frame. Here, "the data volume of audio samples corresponding to one video frame" may refer to the data volume of audio samples to be played when one corresponding video frame is displayed or output. In some embodiments, the data volume of audio samples corresponding to one video frame may be determined according to Equation (6) as below:

$$cap_{pf} = \frac{S_a \times N}{F_v}, \quad (6)$$

where $S_a$ refers to a sampling rate of audio samples; N refers to bits occupied by audio samples collected or captured by the capture device 110 per unit time (e.g., per second); $F_v$ refers to a frame rate of video (the number of video frames displayed per second); and $cap_{pf}$ refers to the data volume of audio samples corresponding to one video frame. It should be noted that setting the data volume of audio samples corresponding to one video frame $cap_{pf}$ as the reference data volume is merely for illustration purposes, and is not intended to limit the scope of the present disclosure. In some embodiments, the reference data volume may be the data volume of audio samples corresponding to a fraction of a video frame (e.g., half a video frame, a third of a video frame, etc.), or more than one video frame (e.g., 1.5 video frames, 2 video frames, etc.), or the like.

In response to a determination that the increment of the volume threshold Δcap does not exceed (e.g., less than or equal to) the reference data volume (e.g., the data volume of audio samples corresponding to one video frame $cap_{pf}$), the processing device 140 may proceed to operation 713. In 713, the processing device 140 (e.g., the first processing module 510) may determine an updated volume threshold by increasing the volume threshold by the increment of the volume threshold Δcap. Merely by way of example, the processing device 140 may determine the updated volume threshold $TH_0'$ according to Equation (7) as below:

$$TH_0' = TH_0 + \Delta cap. \quad (7)$$

In some embodiments, the processing device 140 may adjust the volume threshold of the data buffer in one or more other ways. For example, the processing device 140 may adjust the volume threshold of the data buffer according to a first compensation value $C_1$. Specifically, the processing device 140 may determine the updated volume threshold $TH_0'$ according to Equation (7') as below:

$$TH_0' = TH_0 + m_1 \times C_1, \quad (7')$$

where $m_1$ refers to a weight of the first compensation value $C_1$. $m_1$ may be determined according to the time difference ΔT.

Increasing the volume threshold of the data buffer may compensate the increased time for processing video frame(s) in the video channel, thus keeping the synchronization of audio and video. After operation 713, the processing device 140 may proceed to operation 701, and start a next round.

Referring back to operation 711, in response to a determination that the increment of the volume threshold Δcap exceeds the reference data volume (e.g., the data volume of audio samples corresponding to one video frame $cap_{pf}$), the processing device 140 may proceed to operation 715. In 715, the processing device 140 (e.g., the first processing module 510) may discard one video frame when the first successive video frames are outputted from the video channel. The discarded video frame may be an unprocessed video frame (e.g., one of the first successive video frames).

In 717, the processing device 140 (e.g., the first processing module 510) may determine whether the time difference ΔT is less than a second time threshold. The second time threshold may be a real number equal to or less than 0. In some embodiments, the second time threshold may be equal to the first time threshold. For example, the first time threshold and the second time threshold may both be 0. Alternatively or additionally, the second time threshold may be different from the first time threshold. For example, the first time threshold may be 0.1 ms, while the second threshold may be −0.1 ms. As another example, the first time threshold may be 0.11 ms, while the second threshold may be −0.09 ms. In response to a determination that the time difference ΔT is less than the second time threshold, indicating that processing the first group of successive video frames takes less time than processing the second group of successive video frames, the retention time in the data buffer of one or more audio samples corresponding to the first group of successive vide frames may need to be shortened. Specifically, the processing device 140 may proceed to operation 719.

In 719, the processing device 140 (e.g., the first processing module 510) may designate a third data volume of audio samples corresponding to the time difference ΔT as a decrement of the volume threshold. Here, "a third data volume of audio samples corresponding to the time difference ΔT" may refer to a data volume that audio samples are inputted in the data buffer within an absolute value of the time difference ΔT. For example, the processing device 140 may determine the decrement of the volume threshold according to Equation (8) as below:

$$\Delta cap' = S_a \times N \times |\Delta T|, \quad (8)$$

where $S_a$ refers to a sampling rate of audio samples; N refers to bits occupied by audio samples collected or captured by the capture device 110 per unit time (e.g., per second); and Δcap' refers to the decrement of the volume threshold. In some embodiments, N may be equal to 16.

In 721, the processing device 140 (e.g., the first processing module 510) may determine whether the decrement of the volume threshold Δcap' exceeds the reference data volume. The reference data volume may be the data volume of audio samples corresponding to one video frame. In some embodiments, the data volume of audio samples corresponding to one video frame $cap_{pf}$ may be determined according to Equation (6) described above. It should be noted that setting the data volume of audio samples corresponding to one video frame $cap_{pf}$ as the reference data volume is merely for illustration purposes, and is not intended to limit the scope of the present disclosure. In some embodiments, the reference data volume may be the data volume of audio samples correspond to a fraction of a video frame (e.g., half video frame, a third video frame, etc.), or more than one video frame (e.g., 1.5 video frames, 2 video frames, etc.) or the like.

In response to a determination that the decrement of the volume threshold Δcap' does not exceed (e.g., less than or equal to) the reference data volume (e.g., the data volume of audio samples corresponding to one video frame $cap_{pr}$), the processing device 140 may proceed to operation 723. In 723, the processing device 140 (e.g., the first processing module 510) may determine an updated volume threshold by decreasing the volume threshold by the decrement of the volume threshold Δcap'. Merely by way of example, the processing device 140 may determine the updated volume threshold $TH_0''$ according to Equation (9) as below:

$$TH_0'' = TH_0 - \Delta cap'. \quad (9)$$

In some embodiments, the processing device 140 may adjust the volume threshold of the data buffer in one or more other ways. For example, the processing device 140 may adjust the volume threshold of the data buffer according to a second compensation value $C_2$. Specifically, the processing device 140 may determine the updated volume threshold $TH_0'$ according to Equation (9') as below:

$$TH_0' = TH_0 - m_2 \times C_2, \quad (9')$$

where $m_2$ refers to a weight of the second compensation value $C_2$. $m_2$ may be determined according to the time difference ΔT.

Decreasing the volume threshold of the data buffer may compensate the decreased time for processing video frame(s) in the video channel, thus keeping the synchronization of audio and video. After operation 723, the processing device 140 may proceed to operation 701, and start a next round.

Referring back to operation 721, in response to a determination that the decrement of the volume threshold Δcap' exceeds the reference data volume (e.g., the data volume of audio samples corresponding to one video frame $cap_{pf}$), the processing device 140 may proceed to operation 725. In 725, the processing device 140 (e.g., the first processing module 510) may copy one video frame when the first successive video frames are outputted from the video channel. The copied video frame may be a processed video frame (e.g., one of the second successive video frames).

In some embodiments of the present disclosure, the influence of cumulative frequency differences on the synchronization of audio and video is considered. If the time difference ΔT is greater than the first time threshold (e.g., 0), the volume threshold of the data buffer may be increased to compensate the increased time for processing video frames. If the time difference is less than the second time threshold (e.g., 0), the volume threshold of data buffer may be decreased to compensate the decreased time for processing video frames. Thus, the synchronization of audio and video may be achieved. Besides, if the increment of the volume threshold is greater than the reference data volume, one video frame may be discarded when the first successive video frames are outputted from the video channel. If the decrement of the volume threshold is greater than the reference data volume, one video frame may be copied when the first successive video frames are outputted from the video channel. Thus, this may ensure that video frames and its corresponding audio samples can achieve an accurate synchronization within the time for displaying one video frame. For instance, if sixty video frames are showed in one minute, one video frame is showed for one second. The desynchronization of audio and video may be limited within one second.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, operations 717 through 725 may be performed before operations 707 through 715.

In some embodiments, a ratio of an input rate $V_{V1}$ of video frames to an input rate $V_{A1}$ of audio frames may keep at a first constant value, which may ensure that the inputted video frame(s) correspond to the inputted audio sample(s). Here, "correspond to" may refer to a condition that the inputted video frame(s) and the inputted audio sample(s) are collected at the substantially same time. Similarly, a ratio of an output rate $V_{V2}$ of video frames to an output rate $V_{A2}$ of audio frames may keep at a second constant value, which may ensure that the outputted video frame(s) correspond to the outputted audio sample(s). Here, "correspond to" may refer to a condition that when the outputted video frame(s) are displayed, the outputted audio sample(s) may be played substantially synchronously.

In general, the input rate $V_{V1}$ of video frame(s) may be equal to the output rate $V_{V2}$ of video frame(s). Accordingly, the input rate $V_{A1}$ of audio sample(s) may be equal to the output rate $V_{A2}$ of audio sample(s). In this case, the data volume of audio samples buffered in the data buffer may be maintained at substantially the volume threshold $TH_0$. When the input rate $V_{V1}$ of video frame(s) is unequal to the output rate $V_{V2}$ of video frame(s), the input rate $V_{A1}$ of audio sample(s) may be unequal to the output rate $V_{A2}$ of audio sample(s). In this case, the data volume of audio samples buffered in the data buffer cannot be maintained at the volume threshold $TH_0$. The frequent fluctuation of the data volume of buffered audio samples may cause discontinuity in playing audio samples. Thus, the fluctuation of the data volume of buffered audio samples may need to be maintained within a certain range threshold.

Figure 8:
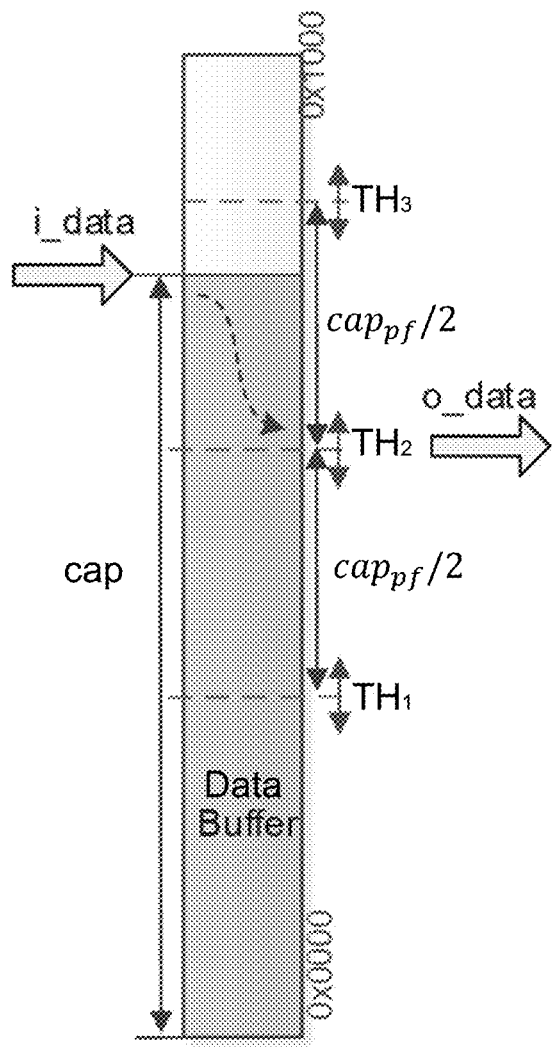
FIG. 8 is a schematic diagram illustrating exemplary volume thresholds of a data buffer according to some embodiments of the present disclosure.

Merely by way of example, FIG. 8 is a schematic diagram illustrating exemplary volume thresholds of a data buffer according to some embodiments of the present disclosure. As shown in FIG. 8, the data buffer may include a first volume threshold $TH_1$, a second volume threshold $TH_2$, and a third volume threshold $TH_3$. In some embodiments, the first volume threshold $TH_1$ may be the volume threshold $TH_0$ described in connection with FIG. 6. That is, the first volume threshold $TH_1=cap_0$. The second volume threshold $TH_2$ and/or the third volume threshold $TH_3$ may relate to the volume threshold and a time for transmitting or displaying one video frame. Merely by way of example, the third volume threshold $TH_3$ may be determined according to Equation (10) as below:

$$TH_3 = cap_0 + cap_{pf} \quad (10)$$

In some embodiments, the second volume threshold $TH_2$ may be determined according to Equation (11) as below:

$$TH_2 = cap_0 + K \times cap_{pf} \quad (11)$$

where K refers to a coefficient (0<K<1). In some embodiments, the data volume of buffered audio samples may fluctuate with respect to the second volume threshold $TH_2$. When K is less than ½, the second volume threshold $TH_2$ may be closer to the first volume threshold $TH_1$ (or the volume threshold $TH_0$) than to the third volume threshold $TH_3$, indicating the data volume of buffered audio samples is near the first volume threshold $TH_1$. When K is greater than ½, the second volume threshold $TH_2$ may be closer to the third volume threshold $TH_3$ than to the first volume threshold $TH_1$ (or the volume threshold $TH_0$), indicating the data volume of buffered audio samples is near the third volume threshold $TH_3$. In some embodiments, K may be equal to ½.

In some embodiments, the first volume threshold $TH_1$ and the third volume threshold $TH_3$ may be assigned with a control margin $\alpha$, that is, the first volume threshold $TH_1=cap_0+\alpha$, and the third volume threshold $TH_3=cap_0+cap_{pf}-\alpha$. In some embodiments, the data volume of buffered audio samples may be within the first volume threshold $TH_1$ and the third volume threshold $TH_3$. In certain embodiments, as shown in FIG. 8, when the data volume of buffered audio samples exceeds the second volume threshold $TH_2$, the buffered audio samples may be outputted from the data buffer.

Figure 9:
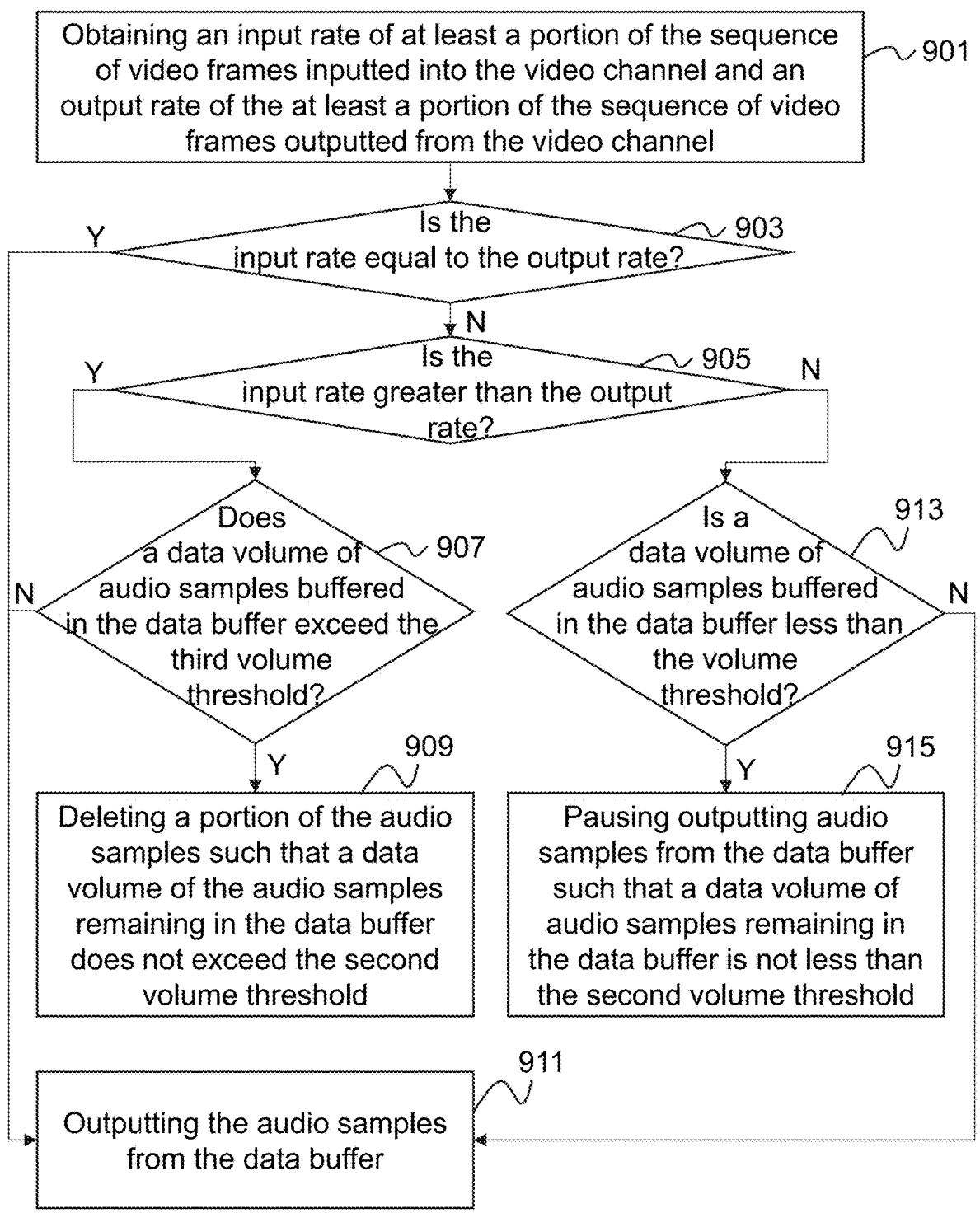
FIG. 9 is a flowchart illustrating an exemplary process for controlling a data volume of audio samples buffered in the data buffer according to some embodiments of the present disclosure.

FIG. 9 is a flowchart illustrating an exemplary process for adjusting a data volume of audio samples buffered in the data buffer according to some embodiments of the present disclosure. For illustration purpose only, the processing device 140 may be described as a subject to perform the process 900. However, one of ordinary skill in the art would understand that the process 900 may also be performed by other entities. For example, one of ordinary skill in the art would understand that at least a portion of the process 900 may also be implemented on the computing device 200 as illustrated in FIG. 2 or the mobile device 300 as illustrated in FIG. 3. In some embodiments, one or more operations of the process 900 may be implemented in the multimedia content processing system 100 as illustrated in FIG. 1. In some embodiments, one or more operations in the process 900 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in a form of electronic current or electrical signals.

In 901, the processing device 140 (e.g., the second processing module 512) may obtain an input rate $V_{V1}$ of at least a portion of the sequence of video frames inputted into the video channel and an output rate $V_{V2}$ of the at least a portion of the sequence of video frames outputted from the video channel. In some embodiments, the processing device 140 may detect and obtain the input rate $V_{V1}$ of video frames and the output rate $V_{V2}$ of video frames in real-time. Alternatively or additionally, the processing device 140 may obtain the input rate $V_{V1}$ of video frames and the output rate $V_{V2}$ of video frames periodically.

In 903, the processing device 140 (e.g., the second processing module 512) may determine whether the input rate $V_{V1}$ is equal to the output rate $V_{V2}$. In response to a determination that the input rate $V_{V1}$ is equal to the output rate $V_{V2}$, the processing device 140 may proceed to operation 911. In 911, the processing device 140 (e.g., the second processing module 512) may output the audio samples from the data buffer. When the input rate $V_{V1}$ is equal to the output rate $V_{V2}$, the input rate $V_{A1}$ of audio sample(s) may be equal to the output rate $V_{A2}$ of audio sample(s). The data volume of audio samples buffered in the data buffer may be maintained at substantially the volume threshold $TH_0$ or the second volume threshold $TH_2$, and the processing device 140 may continually output the audio samples from the data buffer.

Referring back to operation 903, in response to a determination that input rate $V_{V1}$ is not equal to the output rate $V_{V2}$, the processing device 140 may proceed to operation 905. In 905, the processing device 140 (e.g., the second processing module 512) may determine whether the input rate $V_{V1}$ is greater than the output rate $V_{V2}$.

In response to a determination that the input rate $V_{V1}$ is greater than the output rate $V_{V2}$, the processing device 140 may proceed to operation 907. In 907, the processing device 140 (e.g., the second processing module 512) may determine whether a data volume of audio samples buffered in the data buffer cap exceeds the third volume threshold $TH_3$. When the input rate $V_{V1}$ is greater than the output rate $V_{V2}$, the input rate $V_{A1}$ of audio sample(s) may be greater than the output rate $V_{A2}$ of audio sample(s), and audio samples in the audio channel may increase. Accordingly, the data volume of audio samples buffered in the data buffer cap may increase. In response to a determination that the data volume of buffered audio samples cap exceeds the third volume threshold $TH_3$, the processing device 140 may proceed to operation 909. In 909, the processing device 140 (e.g., the second processing module 512) may delete a portion of the audio samples such that a data volume of the audio samples remaining in the data buffer does not exceed the second volume threshold $TH_2$. In some embodiments, the deleted portion of the audio samples may substantially correspond to one or more video frames discarded in the video channel. The audio samples corresponding to the discarded video frame may be deleted. In some embodiments, the buffer is an FIFO (First In First Out) buffer; when a video frame being processed is discarded, the one or more corresponding audio samples about to be output from the buffer (i.e., the one or more audio samples entering the buffer earlier than other audio sample(s) in the buffer) may be discarded. The discarded video frame(s) may be unprocessed video frames that have been inputted into the video channel. When the input rate $V_{V1}$ is greater than the output rate $V_{V2}$, processing video frames may take a longer time than inputting the video frames. When the time difference between processing video frames and inputting the video frames exceeds the time for processing one video frame, the unprocessed video frame may be discarded in the video channel.

In 907, in response to a determination that the data volume of buffered audio samples cap does not exceed the third volume $TH_3$, the processing device 140 may proceed to operation 911 to output the audio samples from the data buffer.

Referring back to operation 905, in response to a determination that the input rate $V_{V1}$ is less than the output rate $V_{V2}$, the processing device 140 may proceed to operation 913. In 913, the processing device 140 (e.g., the second processing module 512) may determine whether a data volume of audio samples buffered in the data buffer is less than the first volume threshold $TH_1$. When the input rate $V_{V1}$ is less than the output rate $V_{V2}$, the input rate $V_{A1}$ of audio sample(s) may be less than the output rate $V_{A2}$ of audio sample(s), and audio samples in the audio channel may decrease. Accordingly, the data volume of audio samples buffered in the data buffer cap may decrease. In response to a determination that the data volume of buffered audio samples cap is less than the first volume threshold $TH_1$, the processing device 140 may proceed to operation 915. In 915, the processing device 140 (e.g., the second processing module 512) may pause outputting audio samples from the data buffer such that a data volume of audio samples remaining in the data buffer is not less than the second volume threshold $TH_2$. In 913, in response to a determination that the data volume of buffered audio sample cap is not less than the first volume threshold $TH_1$, the processing device 140 may proceed to operation 911 to output the audio samples from the data buffer.

In some embodiments of the present disclosure, the influence of the rate difference of the input rate $V_{V1}$ of video frame(s) and the output rate $V_{V1}$ of video frame(s) on the data volume of buffered audio samples may be considered. When it is determined that the input rate $V_{V1}$ is not equal to the output rate $V_{V1}$, the data volume of buffered audio samples may be adjusted to ensure that the date volume of buffered audio samples remaining in the data buffer is within the range defined by the first volume threshold $TH_1$ and the third volume threshold $TH_3$, thereby maintaining the date volume of buffered audio samples at substantially the second volume threshold $TH_2$.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, operations 913 and 915 may be performed before operations 907 and 909.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for synchronizing audio and video, comprising:
    at least one storage device including a set of instructions;
    at least one processor in communication with the at least one storage device, wherein when executing the set of instructions, the at least one processor is configured to cause the system to perform operations including:
    obtaining a data stream including a sequence of video frames and a sequence of audio samples;
    inputting the sequence of video frames into a video channel, the sequence of video frames being processed in the video channel and outputted from the video channel;
    inputting, for processing, the sequence of audio samples into an audio channel, the audio channel including a data buffer configured to buffer processed audio samples, a volume threshold of the data buffer being determined according to a time for processing one or more successive video frames of the sequence of video frames, the one or more successive video frames corresponding to the buffered audio samples, including:
        determining a time difference between a first time for processing a first group of successive video frames and a second time for processing a second group of successive video frames, a frame count of the first group of successive video frames being same as a frame count of the second group of successive video frames, the first group of successive video frames including video frames to be processed and the second group of successive video frames including processed video frames;
        in response to a determination that the time difference is greater than a first time threshold, increasing the volume threshold of the data buffer; or
        in response to a determination that the time difference is less than a second time threshold, decreasing the volume threshold of the data buffer;
    determining whether a data volume of audio samples buffered in the data buffer exceeds the volume threshold; and
    in response to a determination that the data volume of the buffered audio samples exceeds the volume threshold of the data buffer, outputting the buffered audio samples from the audio channel.

2. The system of claim 1, wherein the volume threshold of the data buffer is equal to a data volume of audio samples that needs to be buffered when one video frame in the video channel is processed.

3. The system of claim 1, wherein the at least one processor is further configured to cause the system to perform additional operations including:
    receiving one or more output instructions for outputting audio samples; and
    in response to the determination that the data volume of the buffered audio samples exceeds the volume threshold of the data buffer, outputting, based on the one or more received output instructions, the buffered audio samples from the audio channel.

4. The system of claim 1, wherein the second time threshold is equal to the first time threshold.

5. The system of claim 1, wherein increasing the volume threshold of the data buffer, the at least one processor is configured to cause the system to perform additional operations including:
    designating a second data volume of audio samples corresponding to the time difference as an increment of the volume threshold;
    determining whether the increment of the volume threshold exceeds a data volume of audio samples corresponding to one video frame; and
    in response to a determination that the increment of the volume threshold is less than the data volume of audio samples corresponding to one video frame, determining an updated volume threshold by increasing the volume threshold by the increment of the volume threshold.

6. The system of claim 5, wherein the at least one processor is further configured to cause the system to perform additional operations including:
    in response to a determination that the increment of the volume threshold exceeds the data volume of audio samples corresponding to one video frame, discarding one video frame when the first group of successive video frames are outputted from the video channel.

7. The system of claim 6, wherein the discarded video frame is an unprocessed video frame.

8. The system of claim 1, wherein decreasing the volume threshold of the data buffer, the at least one processor is configured to cause the system to perform additional operations including:
    designating a third data volume of audio samples corresponding to the time difference as a decrement of the volume threshold;
    determining whether the decrement of the volume threshold exceeds a data volume of audio samples corresponding to one video frame; and
    in response to a determination that the decrement of the volume threshold is less than the data volume of audio samples corresponding to one video frame, determining an updated volume threshold by decreasing the volume threshold by the decrement of the volume threshold.

9. The system of claim 8, wherein the at least one processor is further configured to cause the system to perform additional operations including:
    in response to a determination that the decrement of the volume threshold exceeds the data volume of audio samples corresponding to one video frame, copying one video frame when the first group of successive video frames are outputted from the video channel.

10. The system of claim 9, wherein the copied video frame is a processed video frame.

11. The system of claim 1, wherein the data buffer further includes a second volume threshold and third volume threshold, the second volume threshold and/or the third volume threshold relating to the volume threshold and a time for transmitting or displaying one video frame.

12. The system of claim 11, wherein the at least one processor is configured to cause the system to perform additional operations including:
obtaining an input rate of at least a portion of the sequence of video frames inputted into the video channel and an output rate of the at least a portion of the sequence of video frames outputted from the video channel; and
determining whether the input rate is greater than the output rate.

13. The system of claim 12, wherein the at least one processor is further configured to cause the system to perform additional operations including:
in response to a determination that the input rate is greater than the output rate, determining whether a data volume of audio samples buffered in the data buffer exceeds the third volume threshold; and
in response to a determination that the data volume of the audio samples buffered in the data buffer exceeds the third volume threshold, deleting a portion of the audio samples such that a data volume of the audio samples remaining in the data buffer does not exceed the second volume threshold.

14. The system of claim 12, wherein the at least one processor is further configured to cause the system to perform additional operations including:
in response to a determination that the input rate is less than the output rate, determining whether a data volume of audio samples buffered in the data buffer is less than the volume threshold; and
in response to a determination that the data volume of the audio samples buffered in the data buffer is less than the volume threshold, pausing outputting audio samples from the data buffer such that a data volume of audio samples remaining in the data buffer is not less than the second volume threshold.

15. A method for synchronizing audio and video implemented on a computing device having at least one processor, at least one computer-readable storage medium, and a communication platform connected to a network, comprising:
obtaining a data stream including a sequence of video frames and a sequence of audio samples;
inputting the sequence of video frames into a video channel, the sequence of video frames being processed in the video channel and outputted from the video channel;
inputting, for processing, the sequence of audio samples into an audio channel, the audio channel including a data buffer configured to buffer processed audio samples, a volume threshold of the data buffer being determined according to a time for processing one or more successive video frames of the sequence of video frames, the one or more successive video frames corresponding to the buffered audio samples, including:
determining a time difference between a first time for processing a first group of successive video frames and a second time for processing a second group of successive video frames, a frame count of the first group of successive video frames being same as a frame count of the second group of successive video frames, the first group of successive video frames including video frames to be processed and the second group of successive video frames including processed video frames;
in response to a determination that the time difference is greater than a first time threshold, increasing the volume threshold of the data buffer; or
in response to a determination that the time difference is less than a second time threshold, decreasing the volume threshold of the data buffer;
determining whether a data volume of audio samples buffered in the data buffer exceeds the volume threshold; and
in response to a determination that the data volume of the buffered audio samples exceeds the volume threshold of the data buffer, outputting the buffered audio samples from the audio channel.

16. The method of claim 15, wherein the volume threshold of the data buffer is equal to a data volume of audio samples that needs to be buffered when one video frame in the video channel is processed.

17. The method of claim 15, further comprising:
determining whether an abnormal signal is detected, and
in response to a determination that the abnormal signal is detected, pausing outputting the audio samples from the audio channel and the video frames from the video channel.

18. A non-transitory computer-readable storage medium, comprising at least one set of instructions, wherein when executed by at least one processor of a computing device, the at least one set of instructions directs the at least one processor to perform operations including:
obtaining a data stream including a sequence of video frames and a sequence of audio samples;
inputting the sequence of video frames into a video channel, the sequence of video frames being processed in the video channel and outputted from the video channel;
inputting, for processing, the sequence of audio samples into an audio channel, the audio channel including a data buffer configured to buffer processed audio samples, a volume threshold of the data buffer being determined according to a time for processing one or more successive video frames of the sequence of video frames, the one or more successive video frames corresponding to the buffered audio samples, including:
determining a time difference between a first time for processing a first group of successive video frames and a second time for processing a second group of successive video frames, a frame count of the first group of successive video frames being same as a frame count of the second group of successive video frames, the first group of successive video frames including video frames to be processed and the second group of successive video frames including processed video frames;
in response to a determination that the time difference is greater than a first time threshold, increasing the volume threshold of the data buffer; or
in response to a determination that the time difference is less than a second time threshold, decreasing the volume threshold of the data buffer;
determining whether a data volume of audio samples buffered in the data buffer exceeds the volume threshold; and in response to a determination that the data volume of the buffered audio samples exceeds the volume threshold of the data buffer, outputting the buffered audio samples from the audio channel.

* * * * *